(12) United States Patent
Elliot

(10) Patent No.: US 7,876,788 B2
(45) Date of Patent: *Jan. 25, 2011

(54) NETWORK TIME TRANSFER

(75) Inventor: Mark Elliot, Santa Rosa, CA (US)

(73) Assignee: Symmetricom, Inc., San Jose, CA (US)

( * ) Notice: Subject to any disclaimer, the term of this patent is extended or adjusted under 35 U.S.C. 154(b) by 1586 days.

This patent is subject to a terminal disclaimer.

(21) Appl. No.: 11/098,960

(22) Filed: Apr. 5, 2005

(65) Prior Publication Data

US 2005/0190797 A1 Sep. 1, 2005

Related U.S. Application Data

(63) Continuation of application No. 09/837,793, filed on Apr. 17, 2001, now Pat. No. 6,985,499.

(60) Provisional application No. 60/198,917, filed on Apr. 20, 2000.

(51) Int. Cl.
H04J 3/06 (2006.01)
(52) U.S. Cl. .................. 370/503; 370/474
(58) Field of Classification Search ........... 370/468, 370/469, 471, 475, 476, 503, 505, 506, 509, 370/512, 516, 517, 518, 519, 352, 353, 354, 370/356
See application file for complete search history.

(56) References Cited

U.S. PATENT DOCUMENTS

| | | | |
|---|---|---|---|
| 4,641,304 A * | 2/1987 | Raychaudhuri | 370/447 |
| 5,394,395 A | 2/1995 | Nagai et al. | |
| 5,566,180 A | 10/1996 | Eidson et al. | |
| 5,859,835 A | 1/1999 | Varma et al. | |
| 5,864,557 A | 1/1999 | Lyones | |
| 5,875,175 A * | 2/1999 | Sherer et al. | 370/230 |
| 6,134,531 A | 10/2000 | Trewitt et al. | |
| 6,141,355 A | 10/2000 | Palmer et al. | |
| 6,438,702 B1 | 8/2002 | Hodge | |
| 6,621,791 B1 * | 9/2003 | Davie | 370/230 |

(Continued)

FOREIGN PATENT DOCUMENTS

FR 00 05366 11/2001

(Continued)

OTHER PUBLICATIONS

Klaus Schossmaier, Ulrich Schmid, Martin Horauer and Dietmar Loy, Specification and Implementation of the Universal Time Coordinated Synchronization Unit (UTCSU), Special Issue on the Challenge of Global Time in Large-Scale Distributed Real-Time systems, 1997, pp. 1-35.

(Continued)

Primary Examiner—Chi H. Pham
Assistant Examiner—Kevin Mew
(74) Attorney, Agent, or Firm—Patterson & Sheridan, LLP

(57) ABSTRACT

The invention comprises a method and apparatus for reducing uncertainty in timing on the network. The uncertainty in receive buffers is removed by time stamping the arriving packets before sending the packets to the receive buffer. The uncertainty in the transmission buffer is removed by giving the packets a timestamp in the future, and holding the packets until precisely that time. Time precision is ensured by only releasing time packets at the host physical layer to network boundary at the time specified within the packet.

9 Claims, 23 Drawing Sheets

U.S. PATENT DOCUMENTS

| | | | | |
|---|---|---|---|---|
| 6,816,510 | B1* | 11/2004 | Banerjee | 370/503 |
| 6,831,892 | B2* | 12/2004 | Robinett et al. | 370/232 |
| 6,934,756 | B2* | 8/2005 | Maes | 709/227 |
| 6,985,499 | B2* | 1/2006 | Elliot | 370/503 |
| 7,000,031 | B2* | 2/2006 | Fischer et al. | 709/248 |
| 7,023,868 | B2* | 4/2006 | Rabenko et al. | 370/419 |
| 7,388,887 | B2* | 6/2008 | Gray et al. | 370/519 |
| 2001/0024434 | A1* | 9/2001 | Ayyagari et al. | 370/347 |
| 2002/0018475 | A1* | 2/2002 | Ofek et al. | 370/400 |
| 2002/0041570 | A1* | 4/2002 | Ptasinski et al. | 370/252 |
| 2002/0055999 | A1 | 5/2002 | Takeda | |
| 2002/0057713 | A1* | 5/2002 | Bagchi et al. | 370/468 |
| 2003/0007508 | A1* | 1/2003 | Sala et al. | 370/468 |
| 2004/0008661 | A1* | 1/2004 | Myles et al. | 370/350 |
| 2006/0245454 | A1* | 11/2006 | Balasubramanian et al. | 370/509 |

OTHER PUBLICATIONS

Mingfu Li, Chia-Shu Liao, Wen-Hung Tseng, I-Yu Kuo, Yung-Kuang Chen, A Study for Time Transfer Utilizing Optical Fibers, Proceedings of Asia-Pacific Workshop on Time and Frequency, Tokyo, Japan, Oct.-Nov. 2000, pp. 247-254.

Ulrich Schmid, Johann Klasek, Thomas Mandl, Herbert Nachtnebel, Gerhard R. Cadek, Nikolaus Kero, A Network Time Interface M-Module for Distributing GPS-Time over LANS, Journal of Real-Time Systems 18(1), (2000), 1997, pp. 24-57.

Mills, D.L., Internet Time Synchronization: The Network Time Protocol, IEEE Transactions on Communications, IEEE Inc. New York, US, col. 39, No. 10, Oct. 1, 1991, pp. 1482-1493.

Martin Horauer, Nikolaus Kero, Ulrich Schmid, *A Network Interface for Highly Accurate Clock Synchronization*, Proceedings AUSTROCHIP '00, Graz, Austria, Oct. 2000.

Ulrich Schmid, Martin Horauer, Nikolaus Kero, *How to Distribute GPS-Time Over COTS-based LANs*, Proceedings of the 31st Precise Time and Time Interval Systems and Application Meeting (PTTI 1999), Dana Point, California, Dec. 1999, pp. 545-560.

Klaus Schossmaier, Bettina Weiss, *An Algorithm for Fault-Tolerant Clock State & Rate Synchronization*, Proceedings of the 18th IEEE Symposium on Reliable Distributed Systems (SRDS '1999), Lausanne, Switzerland, Oct. 19-22, 1999, pp. 36-47.

Ulrich Schmid, Herbert Hachtnebel, *Experimental Evaluation of High-Accuracy Time Distribution in a COTS-based Ethernet LAN*, Proceedings of the 24th IFAC/IFIP Workshop on Real-Time Programming (WRTP '99), Schlob Dagstuhl, Germany, May/Jun. 1999, pp. 59-69.

Klaus Schossmaier, *An Interval-Based Framework for Clock Rate Synchronization*, Proceedings of the 16th ACM Symposium on Principles of Distributed Computer (PODC '97); Santa Barbara, USA, Aug. 21-24, 1997, pp. 169-178.

Ulrich Schmid, Klaus Schossmaier, *Interval-Based Clock Synchronization*, Journal of Real-Time Systems 12(2), Mar. 1997, pp. 173, 228 (Reprint from Dagustuhl-Seminar 9611 on "Time-Services", Report Nr. 138, Mar. 11-15, 1996).

S.R. Jefferts, et al., *Two-Way Time and Frequency Transfer Using Optical Fibers*, IEEE Transactions on Instrumentation and Measurement, vol. 45, No. 2, pp. 209-211, Apr. 1997.

Klaus Schossmaier, Dietmar Loy, *An ASIC Supporting External Clock Synchronization for Distributed Real-Time Systems*, Proceedings of the 8th Euromicro Workshop on Real-Time Systems, L'Aquila, Italy, Jun. 12-14, 1996, pp. 277-282.

Ulrich Schmid, *Synchronized Universal Time Coordinated For Distributed Real-Time Systems*, Control Engineering Practice 3(6), 1995, pp. 877-884. (Reprint from Proceedings 19th IFAC/IFIP Workshop on Real-Time Programming (wrtp '94), Lake Reichenau, Germany, 1994, p. 101-107).

A. Imaoka and M. Kihara, *Accurate Time/Frequency Transfer Method Using Bidirectional WDM Transmission*, Electro. Lett, vol. 31, No. 16, 1995, pp. 1361-1362.

\* cited by examiner

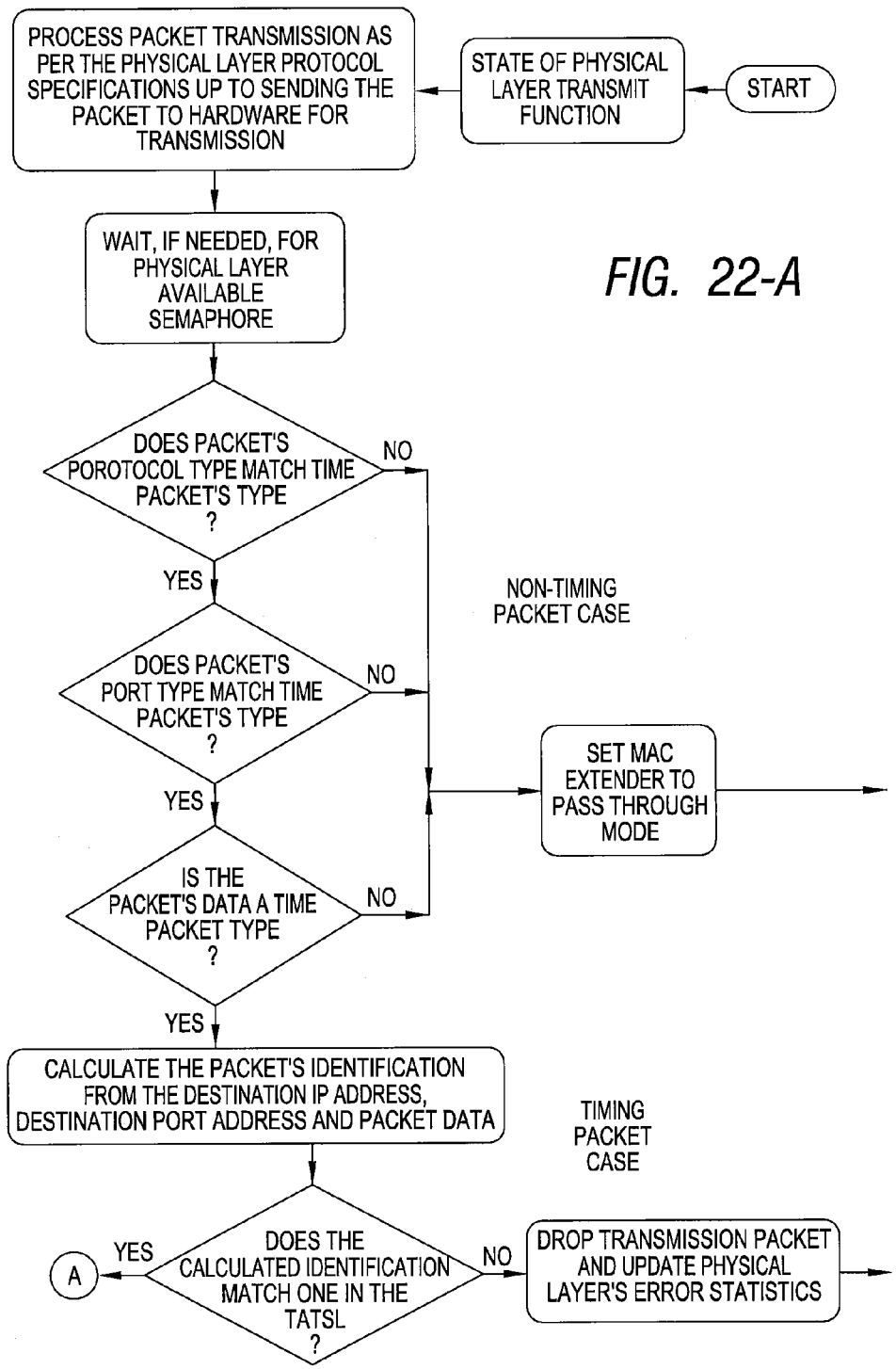
FIG. 22-A

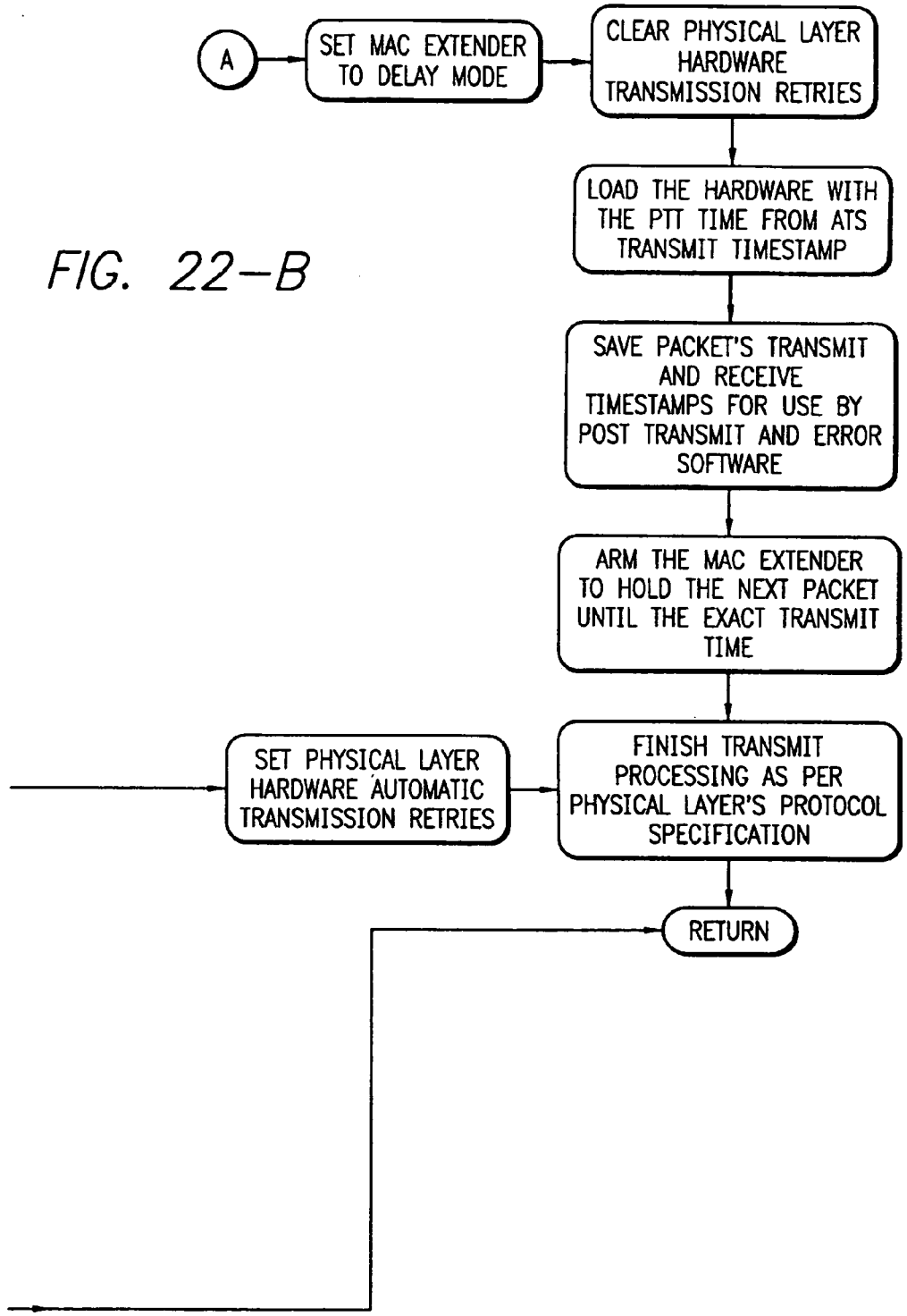
FIG. 22-B

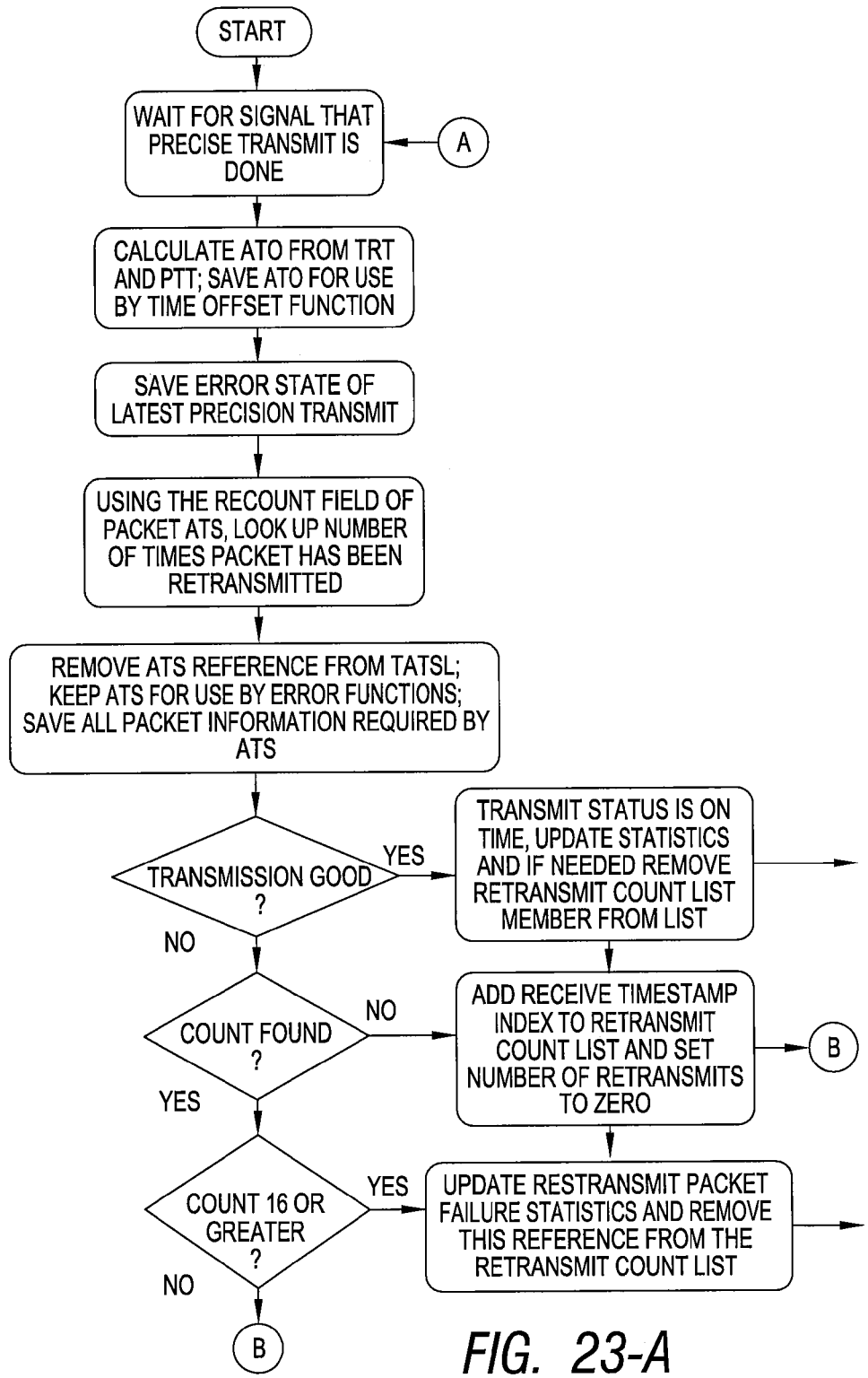
FIG. 23-A

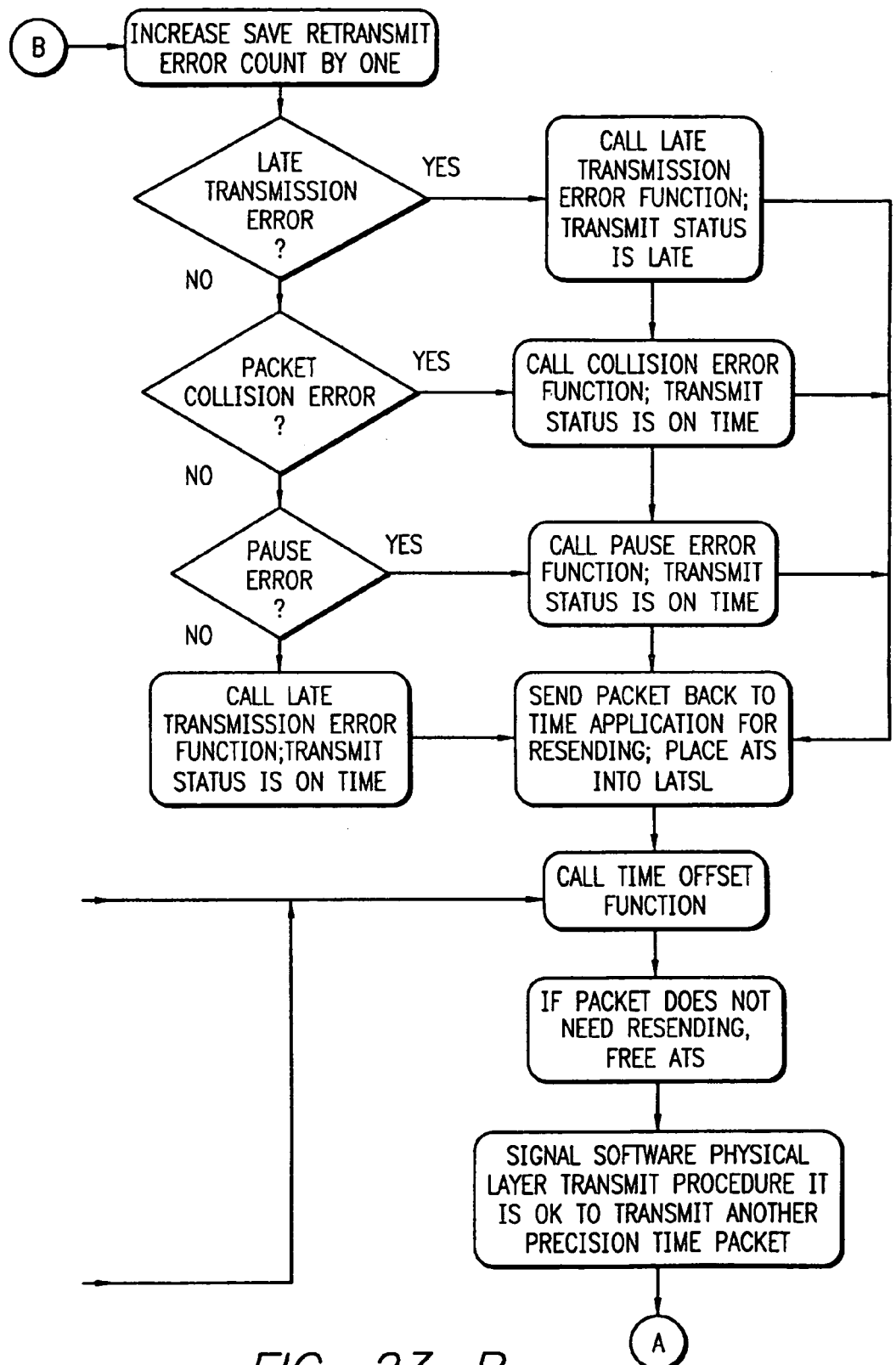
FIG. 23-B

NETWORK TIME TRANSFER

CROSS-REFERENCES TO RELATED APPLICATIONS

This application is a continuation of, and claims a benefit of priority under 35 U.S.C. 120 from patent application U.S. Ser. No. 09/837,793, filed Apr. 17, 2001, now U.S. Pat. No. 6,985, 499 the entire contents of which are hereby expressly incorporated herein by reference for all purposes. This application is related to, and claims a benefit of priority under 35 U.S.C. 119(e) from provisional patent application U.S. Ser. No. 60/198,917, filed Apr. 20, 2000, the entire contents of which are hereby expressly incorporated herein by reference for all purposes.

This application claims the benefit of Provisional Application 60/198,917 filed 20 Apr. 2000.

FIELD OF THE INVENTION

This invention relates to improving the time-offset accuracy between the transmitter and receiver paths over data networks.

BACKGROUND

In the basic Internet protocol or TCP/IP (Transmission Control Protocol/Internet Protocol) information is sent over the Internet in packets. These packets may take different paths, through different lengths of physical network, and through different routers, so as to be subject to varying time delays. The simplest notions of timing include adding a timestamp at each appropriate transmit and receive location to carry time around the network. With relatively sophisticated protocols, the current time transfer limitation through data networks is of an accuracy on the order of 1 millisecond. The limitations are due to unpredictable variations in the amount of time packets spend in transmission and receive buffers. These buffers occur at the sending hardware, the receiving hardware and at routers in between.

A typical network time packet contains four timestamps. The timestamps are designed to precisely time the transmit and receive paths of the client/server time packet interchange and solve for the time offset in the Network Time Client. Any difference in time between the average of the paths represents the time offset from the true time between the client and the server. The problem with this time-honored technique is that it assumes that the transmit and receive paths take the same amount of time. However, when the Internet introduces real differences in the transmit and receive path lengths, due to packet collisions, repeaters, routing, bridging and line delays, then this error directly affects the fundamental accuracy of the time derived over the Internet. Sophisticated protocols such as Network Time Protocol (NTP) and Digital Time Synchronization Protocol (DTSS) overcome some of the network errors by using filtering algorithms and the like. See, for example, D. L. Mills, "Internet time synchronization: the Network Time Protocol." IEEE Trans. Communications COM-39, 10 (October 1991), 1482-1493. However, when the variations in packet transit times reach a certain level, then no amount of filtering will eliminate errors for these protocols.

SUMMARY OF THE INVENTION

The invention comprises a method and apparatus for reducing uncertainty in timing on the network. The uncertainty in receive buffers is removed by time stamping the arriving packets before sending the packets to the receive buffer. The uncertainty in the transmission buffer is removed by giving the packets a timestamp in the future, and holding the packets until precisely that time. Time precision is ensured by only releasing time packets at the host physical layer to network boundary at the time specified within the packet. Precise timing is available to standard network applications and is not limited to the physical layer.

BRIEF DESCRIPTION OF THE DRAWINGS

For a more complete understanding of the present invention, and the advantages thereof, reference is now made to the following descriptions taken in conjunction with the accompanying drawings, in which:

FIG. 22 is a flowchart showing the Software Physical Layer Transmit Function;

FIG. 23 is a flowchart showing the Software Physical Layer Post Transmit and Error Task;

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

Acronyms

| | |
|---|---|
| ATO | Actual Transmit Offset |
| ATS | Auxiliary Timestamp |
| ATSL | Auxiliary Timestamp List |
| ATT | Application Transmit Time |
| CRC | Cyclic Redundancy Check |
| DMA | Direct Memory Addressor |
| FIFO | First In First Out |
| IP | Internet Protocol |
| LATSL | Late Auxiliary Timestamp List |
| MAC | Media Access Controller |
| MII | Media Independent Interface |
| NTP | Network Timing Protocol |
| PHY | Physical Control Layer |
| PTT | Physical Transmit Time |
| RATSL | Receive Auxiliary Timestamp List |
| RD | Retransmit Delay |
| TATSL | Transmit Auxiliary Timestamp List |
| TCP | Transmission Control Protocol |
| TD | Transmit Delay |
| TRT | Transmit Ready Time |
| UDP | User Datagram Protocol |

The uncertainty in receive buffers is removed by time stamping the arriving packets before sending the packets to the receive buffer. The uncertainty in the transmission buffer is removed by giving the packets a timestamp in the future, and holding the packets until precisely that time.

An embodiment of the invention comprises a method that eliminates the errors in transmit and receive timestamps due to network activity and host software such as the operating system, network communication software and other tasks competing for system resources. This method shows the new techniques which achieve this goal in modifications to network time software, physical network driver software and a network topology for precision network client/server devices. It is important to note that this new time technique is not dependent on existing network protocols, drivers or devices. This technique can be applied to a variety of time protocols, networks and physical drivers. Thus, the method applies to a variety of systems using the specified fundamental elements.

Figure 1:
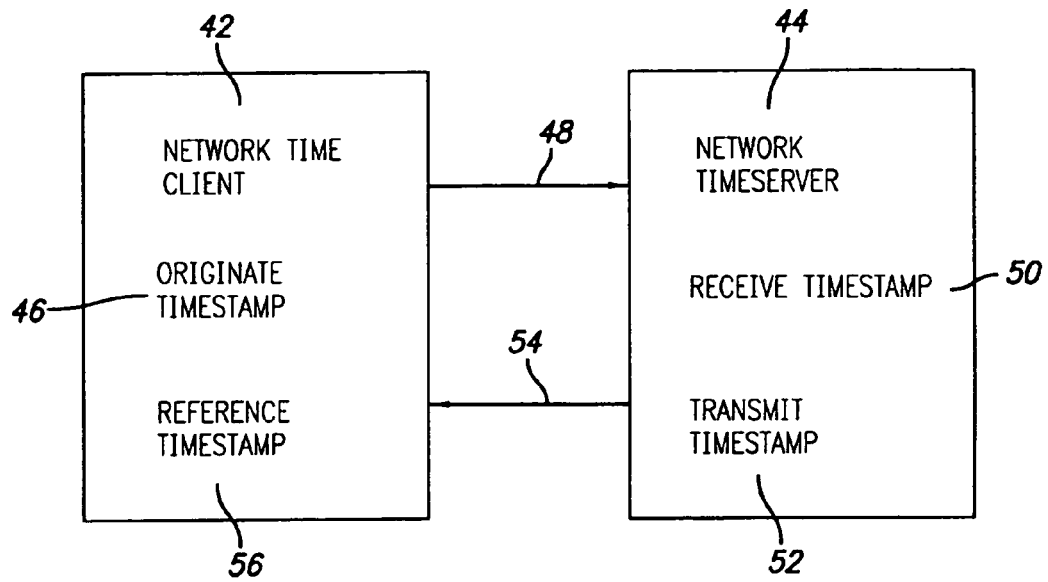
FIG. 1 shows the relationship of the timestamps and the flow of time information.

In this embodiment, time precision is ensured by only releasing time packets at the host physical layer to network boundary at the time specified within the packet. FIG. 1 shows the relationship of the timestamps and the flow of time information. A Network Time Client 42 will send a network packet to a Network Timeserver 44. The Client 42 will specify a time that the packet must be transmitted, called the Originate Timestamp 46. The physical layer of the Network 48 (from the Client 42 to the Network Timeserver 44) is designed to hold the transmission of the packet until the time specified within the Originate Timestamp 46. If the network line 48 is clear at time specified time, then the packet is transmitted. In actual practice, the check for line clear can begin some period ahead of the Originate Timestamp 46 so that the packet truly begins transmission at the specified time. If the network line 48 is not clear (See FIG. 1) for transmission, then the transient packet's Originate Timestamp 46 is modified to a new time in the future. If the physical layer detects that a packet was destroyed during transmission, another new packet must be transmitted with all updated timestamp. New times are chosen in a pseudo-random fashion to avoid synchronous collisions with other time clients and servers. All data within time packets that are dependent on the new time data must be recalculated. This is done by sending the packet back to the Timing Application Software for a new set of timestamps.

As an additional refinement, the time separating alternate time packets can be actively monitored and adjusted based on system activity and throughput. Limits are set for the number of attempts to send the time packet. Some approach is used to distinguish precision time packets from normal network packets. The actual technique used is unimportant. For the Internet, the time protocol can be identified by the packets' User Datagram Protocol (UDP) or Transmission Control Protocol (TCP) port numbers. Non-time packets are handled in the normal unsynchronized manner.

The Network Time Client's 42 packet is received with the precise Originate Timestamp 46 by the Network Timeserver 44. As soon as the packet is received by the physical layer of the server, the packet is marked with a precise Receive Timestamp 50. The time information need not be included in the packet at the physical layer, but can be stored by sonic other means to be used later by server software to construct the packet Receive Timestamp 50. Timestamp information is discarded for packets that do not need precise timing.

The Network Timeserver 44 turns the packet received from the client around and adds the Transmit Timestamp 52. The server handles the packet with the new Transmit Timestamp 52 in the physical layer of the Network 54 (from the Network Timeserver 44 to the Client 42) in a manner directly analogous to the Originate Timestamp 46 in the client. Thus, the returning packet from the Network Timeserver 44 is released onto the physical layer of the Network 54 at the precise time specified in that timestamp.

The Network Time Client 42 finally receives the packet sent from the Network Timeserver 44. The Reference Timestamp 56 is handled in an analogous manner as the Receive Timestamp 50 was by the Network Timeserver 44. The Network Time Client 42 analyzes the timestamps and uses a time protocol to determine the error in time relative to the trusted timeserver. Packets are released onto and received from the network at the precise times indicated by the timestamps. Gone are the errors induced by the operating system and network software as they flow in an unpredictable manner from time application software to the network physical layer.

An important characteristic of this innovation is once both client and server are synchronized, the difference between the receive time difference, which is calculated from the differencing of Receive Timestamp 50 and the Originate Timestamp 46, and the transmit time difference, which is calculated from the differencing of Reference 56 and Transmit 52 Timestamps, precisely indicates the hardware transmission line delay only. Further, the line delays between the transmit time difference and the receive time difference are precisely equal to each other. This greatly simplifies the math involved in calculating the time offset from the timeserver to the time client. A first auxiliary differencing unit may be used to subtract the times of Receive 50 and Originate 46 Timestamps. A second auxiliary differencing unit may be used to subtract the times of Reference 56 and Transmit 52 Timestamps. The first and second auxiliary differencing units may exist as software. A synchronization checker may calculate the differences between the difference calculated by the first auxiliary differencing unit and the difference calculated by the second auxiliary. The synchronization checker may exist as software.

The time offset can be calculated simply if we assume that the errors in the timestamps are small in comparison to the time offset. Using the fact that the transmit and receive delays are truly equal we have the following equation:

Receive Time−(Originate Time−Time Offset)=(Reference Time−Time Offset)−Transmit Time Solving for Time Offset we get:

Time Offset=((Reference Time−Transmit Time)+ (Originate Time−Receive Time))/2

Unfortunately, in a real network, transmit and receive paths become unequal when routers, bridges, repeaters, hubs and other pieces of equipment separate the Time Client from the Timeserver. In fact, by observing the below equations we can see the effect of the error:

(Reference Time−Transmit Time)−(Originate Time− Receive Time)=Transmit Receive Delta Combining equations:

Time Offset=½*Transmit Receive Delta+Originate Time−Receive Time

The point is that ½ of the difference of the receive and transmit time paths adds directly to the error of the calculated Time Offset. As the number of network elements separating the Time Client from the Timeserver increases, so does the potential for errors in calculating true time at the Time Client. It is not unusual for network transmit and receive paths to be off by several milliseconds. This error is not a desirable property. A constant error could be calibrated out. The problem, however, is that the error varies unpredictably on a millisecond time scale, since it depends on consistency of network traffic loading. With the embodiment of this invention, it Is possible to distribute time through the existing network with great precision. Two separate solutions—each with it's own cost and performance trade off.

Network Time Hubs

Link Network Time Clients with Network Timeservers only through network hosts having the certain proposed properties. The most precise method takes the above precision Timeserver with the proposed protocol and physical layer modifications and adds not one but several physical network ports to the device. Now each Time Client connects to the timeserver in a star configuration, much like a network hub or router. If each Time Client uses the same precision network and physical layers as the Time Client, then all Time Clients are precisely synchronized to the server. Further, because there are separate physical ports on the Timeserver, then the Time Clients can exist on completely different networks. One may combine enterprise networks with true Internets. Also, security is not an issue because only Time Client and Time Server pairs are communicating with each other and no information crosses between separate network ports. Also, security comes from providing no more than network time services on the Timeserver's time ports. Control of the Timeserver can enter on just one dedicated port that has no time service capability and the control port connection can be physically broken or cryptographically encoded by the network administrator. Thus, by design, no network hacker can break into the Timeserver. If a GPS, radio, or other wide area synchronization source is use for the Time Server, then multiple star groupings of Network Time Clients and Network Timeservers can be precisely synchronized no matter what network topology is used.

If, for economic or physical reasons, an external timing source cannot be provided to the Time Server hub then, the Time Server may use a conventional time protocol such as NTP (Network Time Protocol) or DTSS (Digital Time Synchronization Protocol) to synchronize to other trusted Time Servers. The Timeserver may, in turn, distribute time as a secondary server. The disadvantage of this technique is that the secondary Timeserver will not be as precise as a primary server, but the errors will be significantly less than in the case of using conventional network equipment. Even without special hubs or routers, significant improvement would be achieved just by improving the client and server inherent timing capability.

Using the outlined methods of distributing time, the limits of time precision are no longer vulnerable to unpredictable and uncontrollable network properties, but instead are only limited by the accuracy of the timing hardware itself. Further it call be accomplished without changes to the physical layer drivers or Media Access Controller. Both of these tasks can be accomplished while preserving all of the rules for packet structure at all network layers, by using hardware and software schemes described below.

Method for Achieving Precise Network Time

Figure 2:
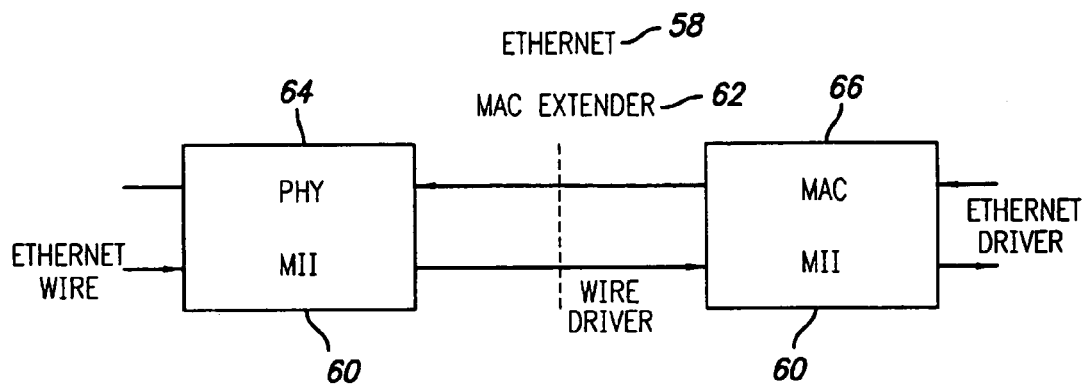
FIG. 2 shows contemporary Ethernet hardware as separated into two physical devices, Ethernet wire and Ethernet driver, with a Media Independent Interface (MII) between them.

Hardware Receive Packet Considerations FIG. 2 shows contemporary Ethernet 58 hardware separated into two physical devices with an interface separating them. That interface is called the Media Independent Interface (MII). 60 The MAC (Media Access Controller) Extender sits 62 between the Physical 64 and MAC 66 layer chips on the MII 60. For all packets on the receive side, the hardware is transparent to the data flow. In other words, packets flow from the PHY 64 (physical layer controller) to the MAC 66 without any alteration. This allows standard PHY 64 and MAC 66 hardware to function without change.

Figure 3:
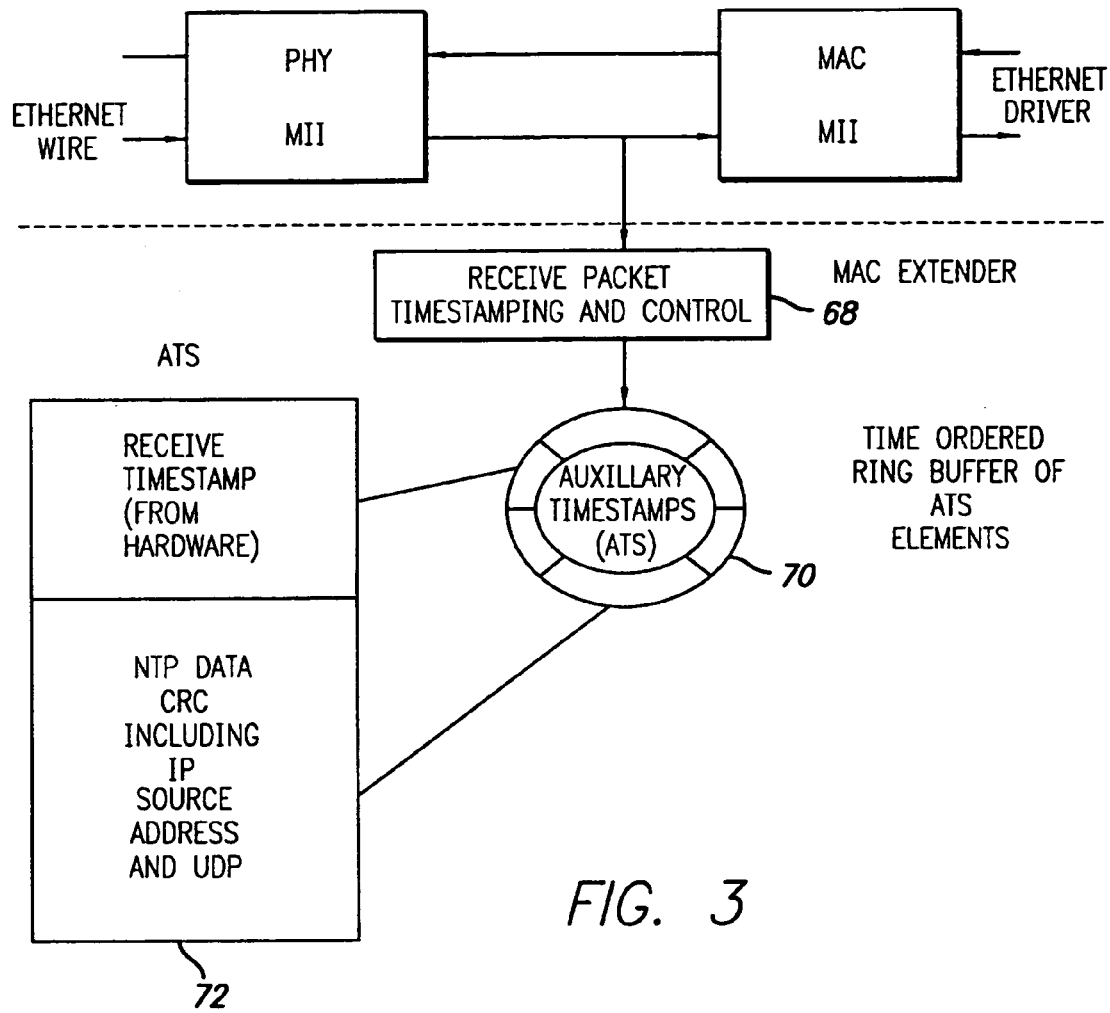
FIG. 3 shows the details of the MAC (Media Access Controller) extender operation.

For receive timing packets addressed directly or indirectly to the unit (FIG. 3), the hardware timestamps 68 the first bit and stores it into an Auxiliary Timestamp (ATS) 70 data structure in shared memory. In addition to the time data, a cyclic redundancy check (CRC) 72 is calculated on the data portion of the time packet and on the Internet Protocol (IP) and UDP (User Datagram Protocol) source addresses (source socket address). This CRC is used by software at the NTP application layer to correlate the ATS data with a particular packet. The MAC Extender ignores all other non-timing packets.

Figure 4:
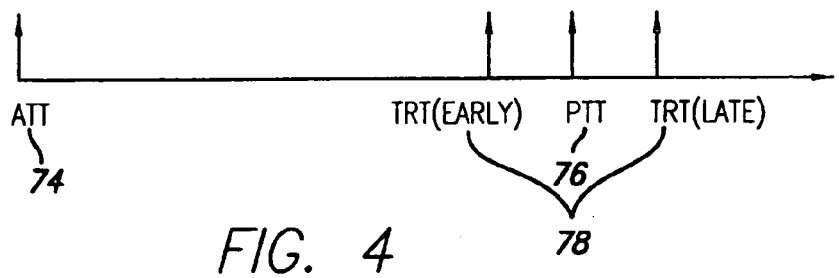
FIG. 4 is a diagram showing the packet transmission line from application transmit to hardware transmit.

FIG. 4 shows the choice and measurement of the actual packet transmission times for the Precision Network Timing. The Application Transmit Time (ATT) 74 is the time the time packet leaves the application layer. It is also a component of the time packet's transmit timestamp, where the transmit timestamp equals ATT+TD (Transmit Delay). This Transmit Delay is the value that is added to ATT to come up with PTT (Physical Transmit Time). The Departure Delay Function, using ATO as input, calculates this number The Physical Transmit Time (PTT) 76 is the time the packet is to be transmitted from hardware. This time is equal to the time packet's transmit timestamp. Transmit Ready Time (TRT) 78 is recorded by hardware. It is the time that the packet became ready to transmit from the hardware. It is used to calculate the value of Actual Transmit Offset (ATO). ATO is a signed value that indicates early or late arrival of the packet in the physical layer hardware. Positive values of ATO are on time (early) and negative values of ATO are late. When a packet is retransmitted due to a prior error, the Retransmit Delay (RD) time is added to the Transmit Delay (TD) to come up with the Physical Transmit Time (PTT).

PTT=ATT+TD+RD.

ATO=PTT−TRT−RD:

where RD is zero unless a packet must be retransmitted.

The choice of the time delay (TD) is important to the transmission throughput. Too small a delay means that packets will not be able to transmit at the desired time. These packets will have to be reprocessed with a new timestamp before another attempt can be made to transmit them. Too long a delay means that packets which are ready to transmit will sit in the output port waiting for their timestamp to be valid, and preventing other packets from leaving.

Figure 5:
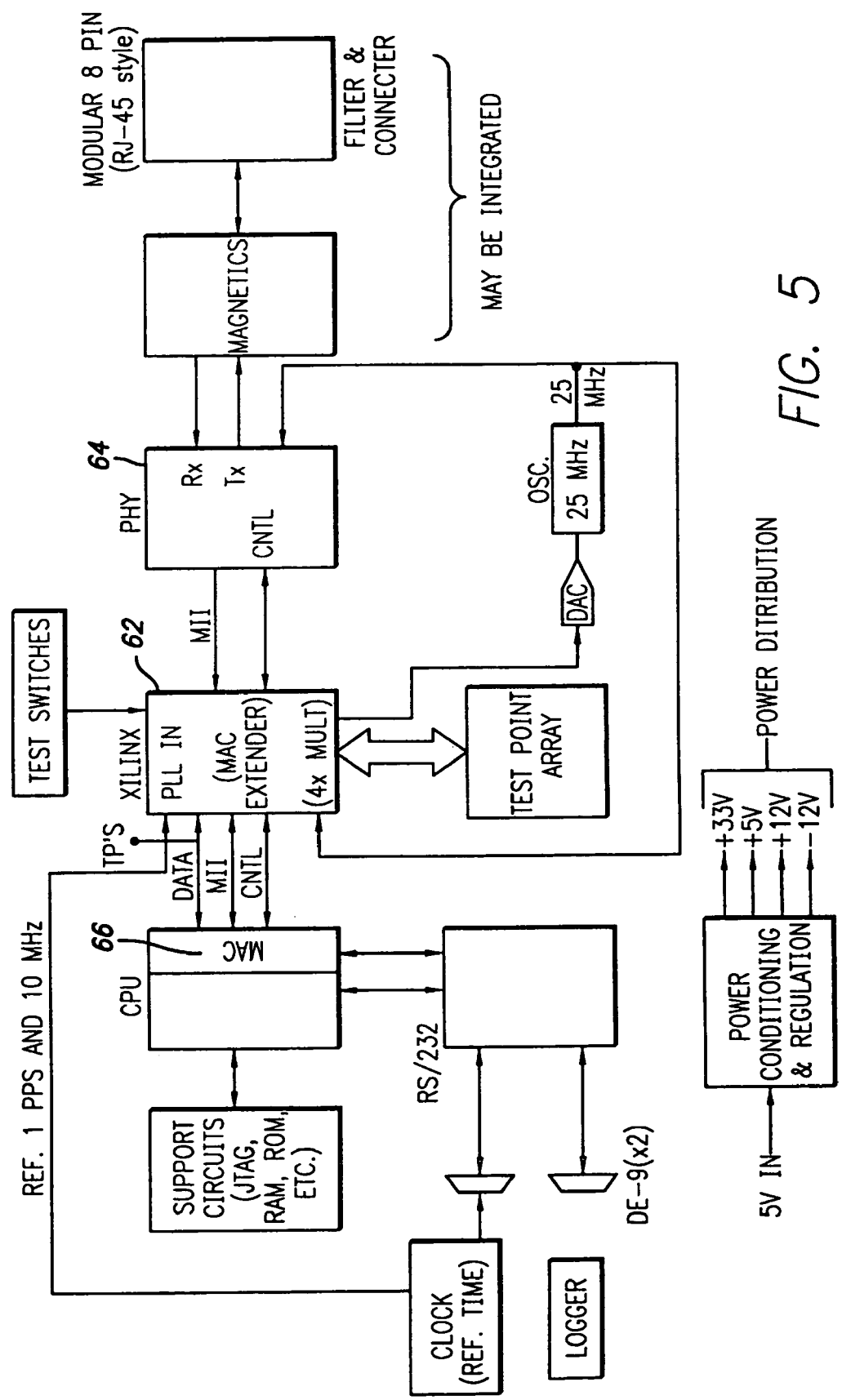
FIG. 5 shows a block diagram of an example circuit, which includes a MAC (Media Access Controller) extender and which can act as a client or a server.

FIG. 5 shows a block diagram of an Ethernet card, but with a MAC Extender 62. To the left of the MAC Extender 62 is the MAC 66. To the right of the MAC Extender 62 is the Physical Layer Chip 64. The circuit can act as either a client or a server. Note that both the client and server have to transmit and receive time packets according to standard NTP. Ethernet is a "carrier-sense multiple access/collision-detection" protocol. An Ethernet message is sent in packets, with a preamble and with error checking (cyclical redundancy checksum or CRC). The Ethernet broadcasts by waiting for a no-activity state on the bus, sending message packet and checking for interference (i.e., a "collision"). If there is no collision, the message continues to be sent. If there is a collision, then the whole bus is notified, the transmission is stopped until a random time later, in which a rebroadcast of the message is tried.

Figure 6:
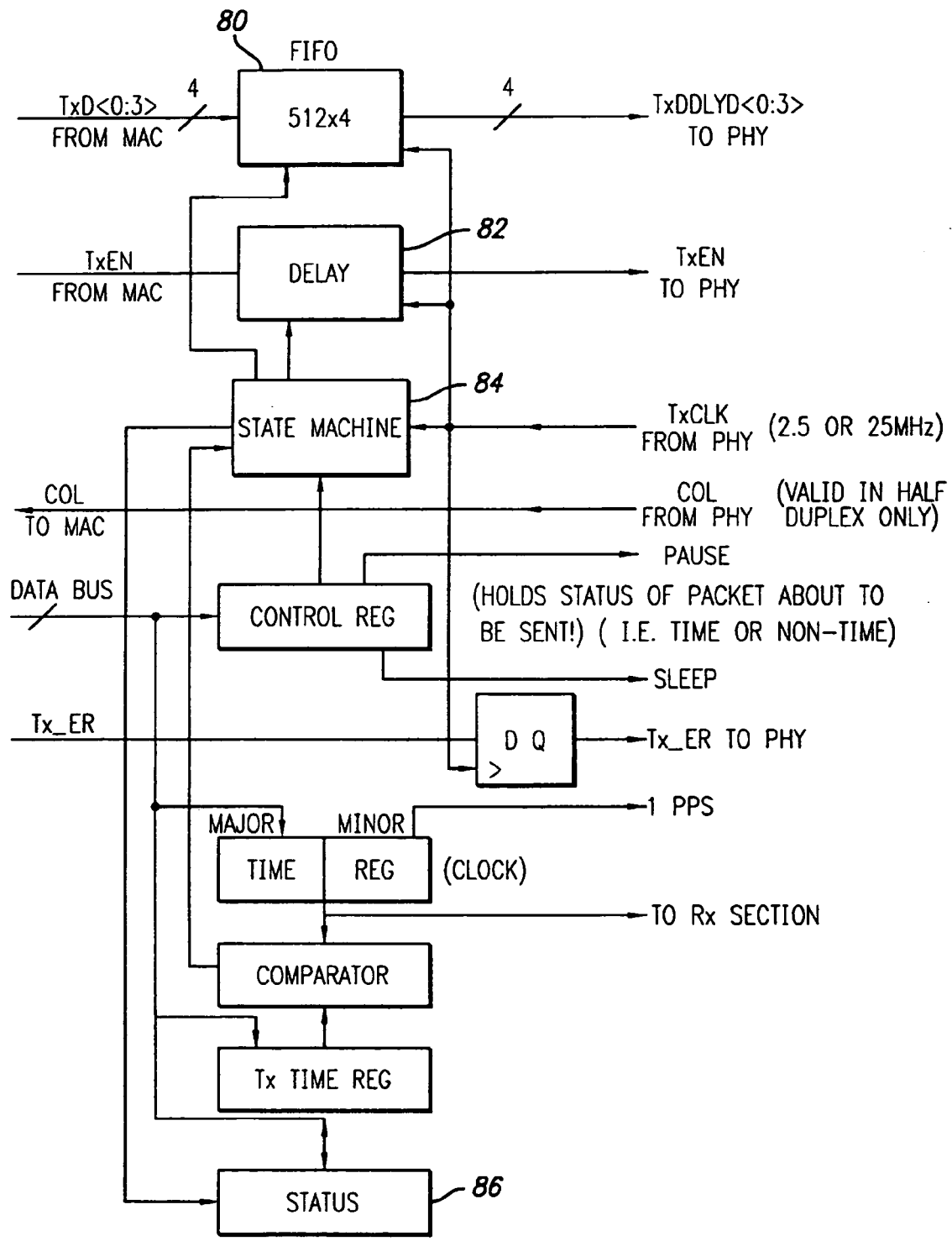
FIG. 6 shows a for a block diagram of a MAC (Media Access Controller) extender—transmitter.

FIG. 6 shows a block diagram of a MAC Extender-transmitter. The transmitter has two modes of operation, namely, "pass through" 80 and "delayed" 82. The mode it is currently in is set Lip by the physical layer software, which snoops the packet stream going to the MAC and detects whether a packet is NTP (Network Time Protocol, i.e., carrying NTP format time information) or not. If not, the transmitter is set to "pass through" 80 mode and the next packet to come out of the MAC is simply passed through the MAC Extender with little delay 80. All normal PHY to MAC signals are passed through as well so that the MAC Extender is transparent to the MAC and the PHY. If the physical layer software detects an NTP packet, it sets the transmitter mode to "delayed" 82. The software then has to figure out what PTT time to send to the transmitter, which it does by using the Auxiliary CRC Generator to calculate an ID for the packet which it matches to one in the Transmit Auxiliary Timestamp List (TATSL). Once the match has been found, the physical layer software fetches the PTT time from the record and writes it to the Transmitter PTT register, which action also arms the state machine. The state machine 84 then waits for a packet to arrive. The packet is captured in a first in first out (FIFO) buffer 80 when it comes in, and will be held until it is time to be transmitted. When the last nibble of the packet has arrived, then hardware time is latched into a TRT freeze register for later use by the application layer software. The state machine then examines "hardware time" for a match with PTT and transmits the data when it becomes equal. There are three possible conditions for PTT when it is examined: PTT could be yet in the future, which means the state machine 84 must wait until later to send the data; PTT could be now, which means the state machine must begin to send the packet out; or PTT could be in the past, which means the Application layer software underestimated when the packet would come out of the MAC and be ready to transient by the MAC Extender. In the first case the state machine 84 marks time until it is time to send the packet. In the second case, it sends the packet and then notifies the application level software via an interrupt. In the third case, it doesn't attempt to send the packet, but notifies the application layer via an interrupt that the intended transmission has failed. The application layer software will read a status register 86 to decode the meaning of all interrupts as well as the TRT freeze register so it can improve it's guess as to what condition to set the PTT.

Figure 7:
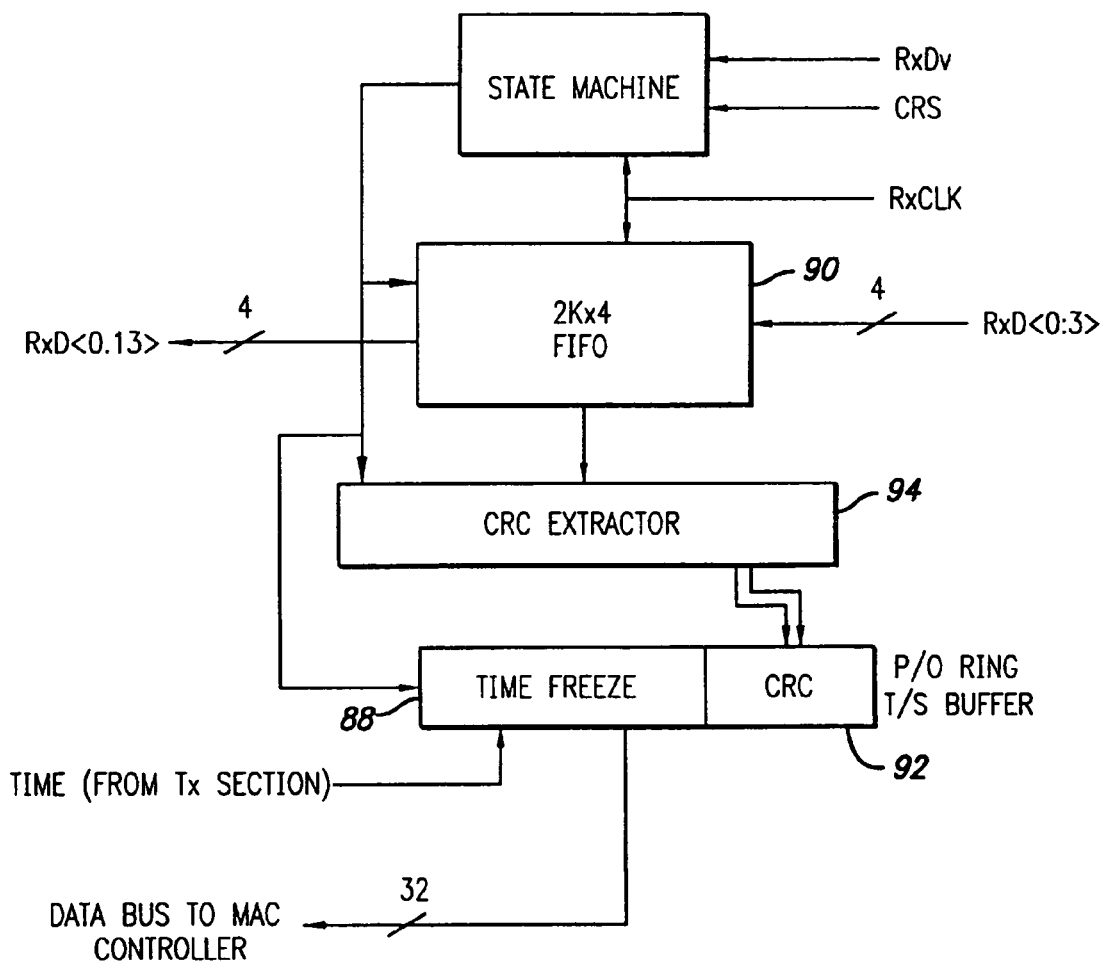
FIG. 7 shows a block diagram for a MAC (Media Access Controller) extender—receiver.

FIG. 7 shows a block diagram of a MAC Extender-receiver. While only NTP packets are time stamped, all packets cause the current hardware time to be frozen temporarily in a freeze register 88. All packets pass to the MAC without interference from the MAC Extender 90. The MAC Extender only "snoops" the receive packets as they go by. As they go by, the nibbles of data are latched into a packet recognizer that decides if the packet is for this address and whether it is an NTP packet or not. If not, the packet is ignored. However, if it is an NTP packet for this address, then the freeze register 88 contents is loaded into the next available ATS ring buffer within the MAC Extender. Appropriate parts of the packet are transferred to a buffer 94, from where they are loaded into a CRC generator 92 that generates a unique ID code for the packet. This ID code is stored in the ATS ring buffer for future use by the software in correlating the timestamp to the packet. The buffer 94 is used so that the MAC Extender can snoop the next incoming packet as it is generating the CRC, a process that takes more time than the inter-packet delay time.

Figure 8:
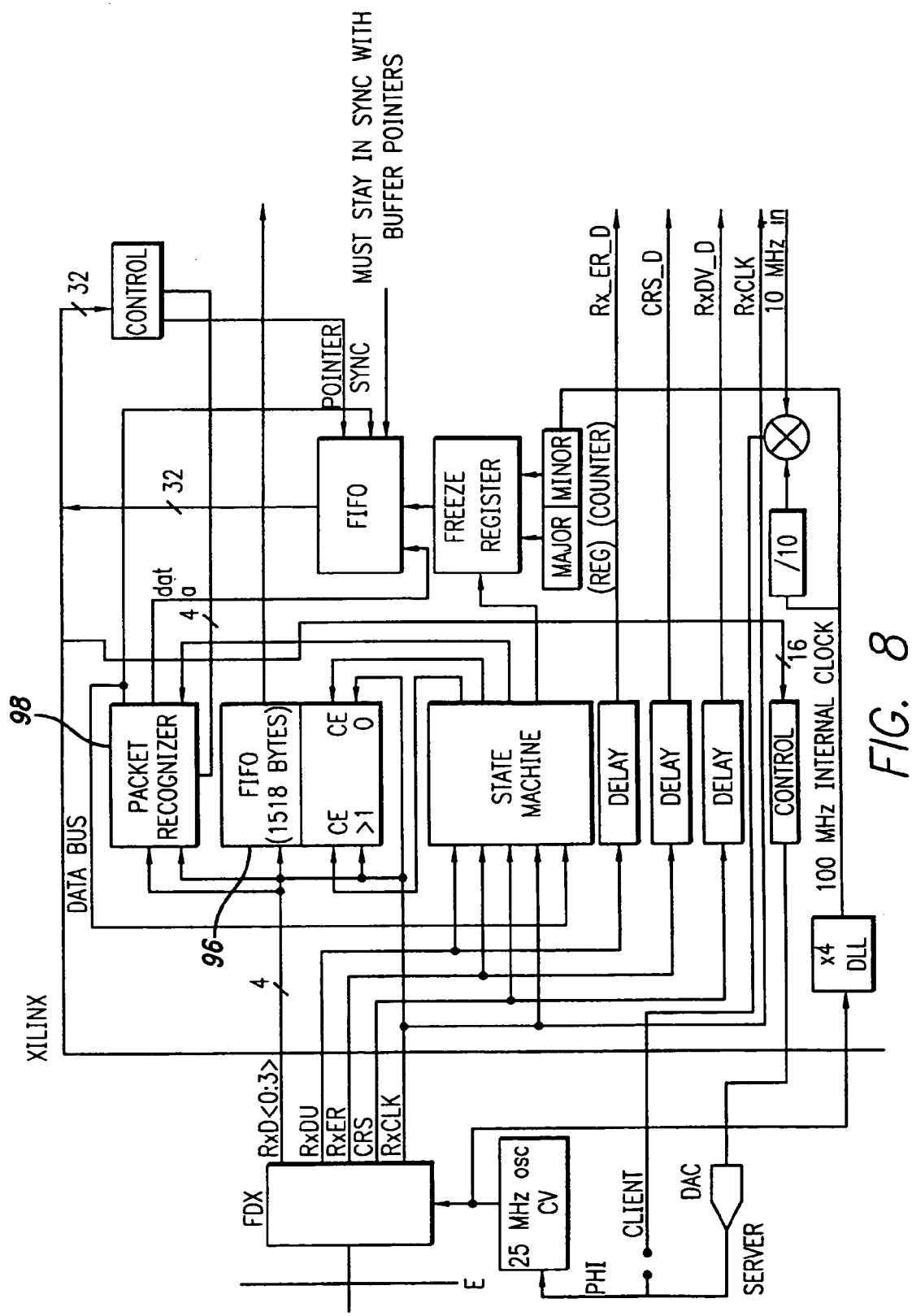
FIG. 8 shows a block diagram for an alternate method MAC (Media Access Controller) extender—receiver.

FIG. 8 shows a block diagram for an alternate MAC Extender-receiver. In this version all packets are stored in a FIFO 96 buffer, until the packet recognizer 98 can determine if the packet is a timing packet. This alternative has the disadvantage of slowing down non-timing packets.

The Auxiliary CRC Generator is used to accelerate the correlating of timestamps to packets by the application layer of software. The application layer software writes a pointer to the MAC Extender, which starts the state machine. The state machine then requests the 32-bit data bus from the processor (e.g., NetARM) chip). When the NetARM chip grants the bus to the MAC Extender, it uses the pointer to direct memory address (DMA) the appropriate parts of the packet record it points to and writes them into a buffer. It then releases the bus. After that, the state machine loads the data into the CRC generator, puts the result in a register, and notifies the application layer software that it is done, via an interrupt. The application layer software, having previously uploaded the timestamps and CRC records from the MAC Extender into its Receive Auxiliary Timestamp List (RATSL) then searches the RATSL for a matching CRC. Having found one, it has successfully matched a timestamp to a packet.

Software Overview—Packet Reception and Transmission

Software Physical Layer Receive Packet Considerations

Figure 9:
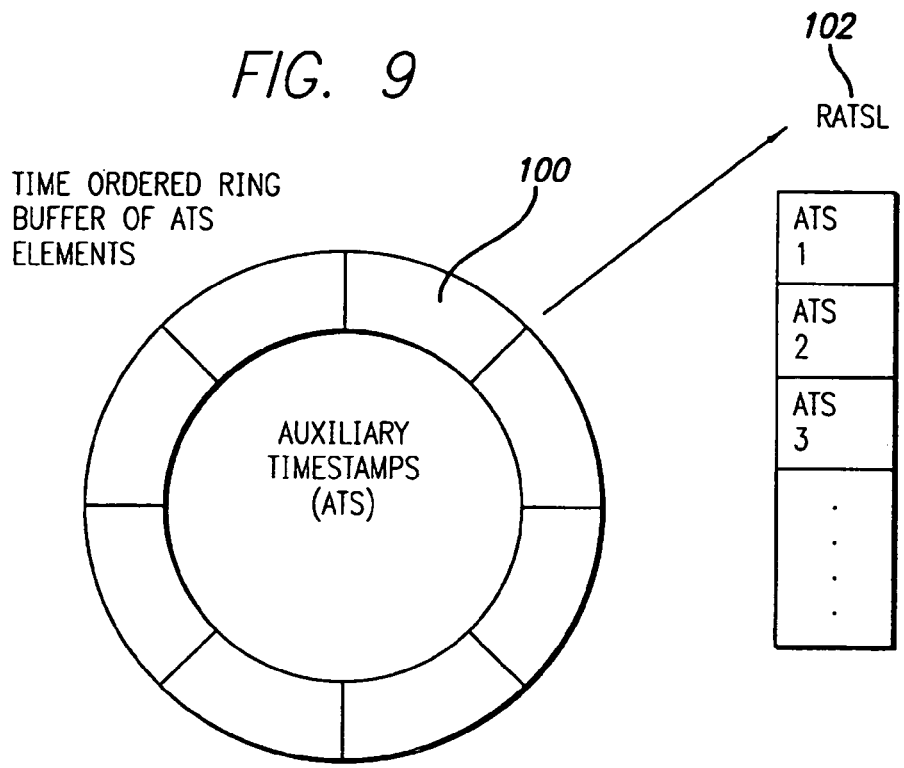
FIG. 9 shows a time ordered ring buffer of auxiliary timestamps (ATS) elements.

An external process monitors the ATS (Auxiliary TimeStamp) ring buffer 100 (FIG. 9) and moves ATS data to a RATSL (Receive Auxiliary TimeStamp List) 102 in time order of the receive timestamps. This monitoring can happen one of several ways including: from the Existing Ethernet interrupt, from an interrupt from the MAC Extender or from fast, high-priority polling. The important consideration is to allocate enough memory to the ring buffer to handle bursts of timing traffic expected between servicing. Should memory become exhausted in either the RATSL or ring buffer, the ATS information is quietly dropped. The final consideration is that the ATS elements in the RATSL must be aged. Packets can be dropped at all layers of the network stack. ATSs that are not used after a predetermined amount of time (judged by the receive timestamp) are removed from the list.

Figure 10:
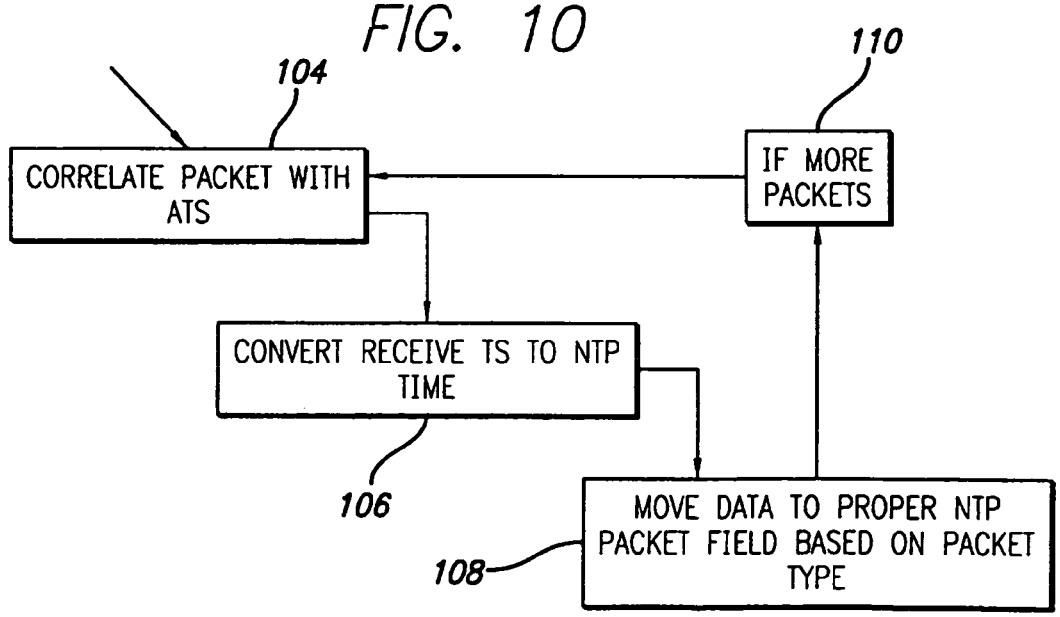
FIG. 10 shows that NTP (Network Time Protocol) receive packet function is modified to correlate a received NTP timing packet to a matching ATS (Auxiliary Time Stamp) CRC (Cyclic Redundancy Check) in the RATSL (Receive Auxiliary TimeStamp List)

Software Application Layer Receive Packet Considerations NTP's receive packet function is modified to correlate 104 a received NTP timing packet to a matching ATS (Auxiliary TimeStamp) CRC (Cyclic Redundancy Check) in the RATSL (Receive Auxiliary TimeStamp List). See FIG. 10. If a packet does not correlate, then it is dropped. If it does correlate, then ATS time is converted into the NTP time format 106 and the ATS is removed from the RATSL. If the NTP packet type is a client request 108, then the tine data is recorded into the NTP receive timestamp field. However, if the NTP packet type is a server response 108, then the time data is moved to the final timestamp variable. After this activity, NTP receive packet processing continues as it did in the original NTP (Network Timing Protocol) protocol 110.

Figure 11:
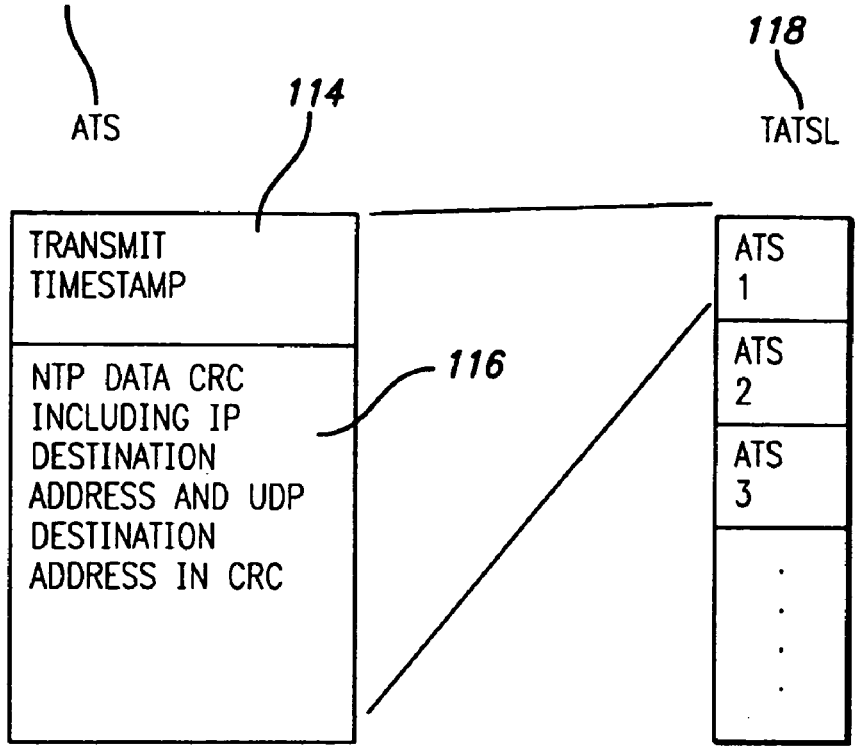
FIG. 11 shows the NTP transmit code modified to predict the future time that the packet can be transmitted.

Software Application Layer Transmit Packet Considerations The NTP transient code is modified such that when transmitting a time packet, a function is called to predict the future time that the packet can be transmitted. See FIG. 11. This future transmit time is placed into the NTP packet. The protocol then optionally adds any authentication or security. An ATS (Auxiliary TimeStamp) 112 is created before transmitting the packet. Inside the ATS is the transmit time 114 and a CRC (Cyclic Redundancy Check) 116 that includes all of the NTP data plus the destination socket address. The transmit ATS 112 is then added to the TATSL (Transmit Auxiliary TimeStamp List) 118 in time order just before packet transmission. The TATSL 118 is aged in a manner similar to the RATSL (Receive Auxiliary TimeStamp List).

Software and Hardware Physical Layer Transmit Packet Considerations At the physical layer, the MAC Extender hardware resides on the transmit side of the MII interface between the Phy and MAC Ethernet chips. Non-timing packets pass through with no delays. However, when the Ethernet software detects an NTP timing packet, then the MAC Extender is programmed to delay the packet until the time specified in the ATS. The ATS is found in the TATSL in a manner similar to that used by the RATSL. Another important consideration is the Ethernet software turns off automatic retransmission of packets in the MAC. Automatic retransmission is turned on again for non-NTP timing packets.

Figure 12:
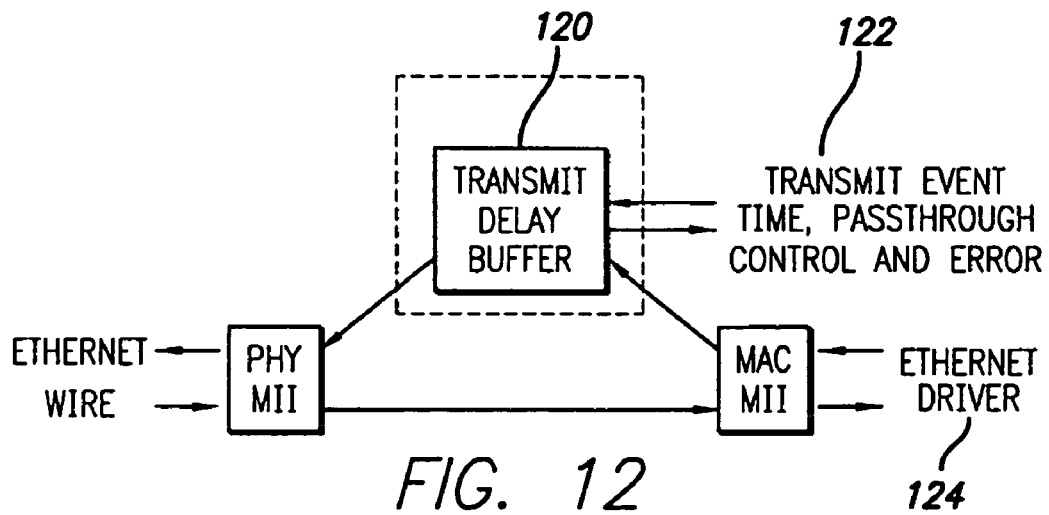
FIG. 12 shows the MAC Extender operating as a stand-alone product.

Alternatively, the transmit physical layer software logic 120 (FIG. 12) will move into the MAC Extender transmit hardware logic 120. By having the hardware reference the TATSL and filter automatically for NTP timing packets, it can initiate the delay and transmission itself 122. Further, the MAC Extender can ignore packet retransmissions from the MAC for NTP timing packets. The main advantage of this technique is that the Ethernet driver software 124 operates blissfully unaware of the precision timing process and does not need to be changed. This means that standard Ethernet driver software can be used. In this fashion, the MAC Extender could be produced as a stand-alone product.

Transmit Error Considerations Packets may not transmit for a variety of reasons. First, the time estimated to transmit the packet might have already passed due to changes in the loading dynamics of the system. Second, the Ethernet transmit line may be held in PAUSE by the receiving side or, third, a packet collision occurring in Ethernet half-duplex mode. For this embodiment full duplex Ethernet operation is required and the PAUSE option is excluded. Then the remaining case is that the packet transmit time has elapsed.

Figure 13:
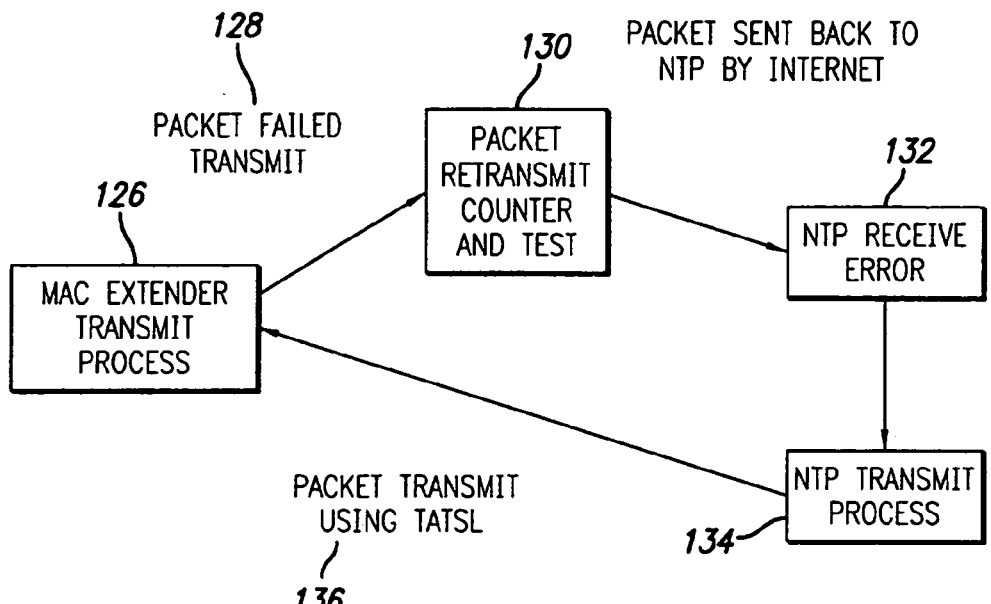
FIG. 13 shows the error function, at the physical layer.

Nevertheless, the cause of the error does not significantly matter. See FIG. 13. The MAC Extender 126 will not transmit the packet if anything prevents the packet from leaving at the designated time. Packets that do not transmit 128 are returned to the NTP timing application 130. Returned packets are placed into the Late ATS List. Typically retransmitted packets will require many pieces of information for retransmission and this information is placed into the ATS before adding the ATS to the LATSL. As an alternative to the LATSL, a special internal IP "loopback" channel and socket 132 could be added to the NTP application in the receive packet section for these returned packets.

Some of this information is universal and others depend on the time application and network protocols used. The critical data is the Retry Count, Error Delay, packet data and packet size. The Retry Count is the current number of times the packet has attempted to transmit and Error Delay is the additional delay required depending on the transmit error type. Examples of protocol dependent parameters are the IP and UDP addresses. Examples of Time Application dependent parameters are the Key Identification specifying the private key used to authenticate the packet at the application level and the UDP datagram file descriptor.

Packets found in LATSL by the NTP application are turned back around to the physical layer quickly—only altering the transmit timestamp and calculating optional security signatures. On retransmission from NTP 134, a new ATS is created and the TATSL 136 works as before.

One final consideration is that the error handling function, at the physical layer, keeps track of the number of times a packet transmission is attempted. Once packet transmission attempts exceed a maximum number, then the packet is dropped. Entries in this list are removed on successful transmission and they are aged in a similar manner as the RATSL and TATSL.

Figure 14:
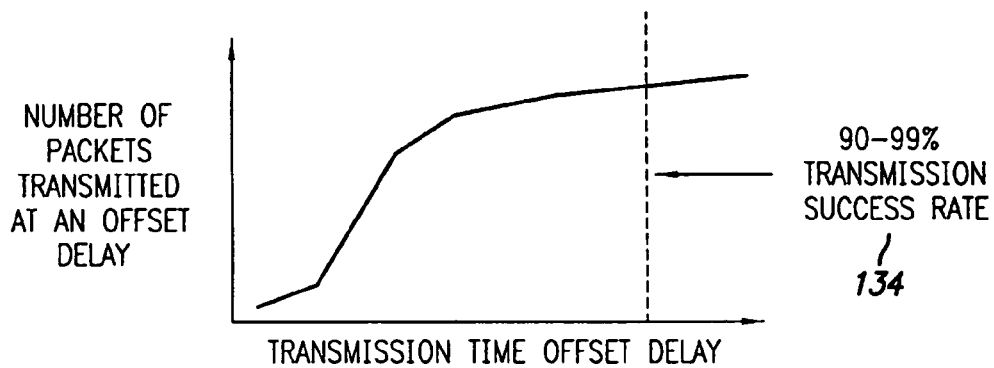
FIG. 14 shows the NTP modified to use a procedure to predict the transmission times and place this predicted time into the transmit packet.

Transmit Time Prediction NTP will be modified to use a procedure to predict the transmission times at the hardware and place this predicted time into the transmit packet instead of using the actual time of transmission at the application layer. When packets transmit at the MAC Extender, the difference between the actual time of transmission and the time the packet has been waiting for transmission is calculated. The positive or negative delta time value is fed into the prediction routine. This delta is fed into the statistical filter to calculate a new prediction of the transmission time offset delay times. See FIG. 14. The goal is to transmit 90 to 99% of the packets 134 without a retransmission. Proposed methods for this filter include a moving average filter where a fraction of the last delta is added with a historical average or using standard mathematical curve fitting techniques, such as least squares, where the curve is derived experimentally. Other fixed or adaptive low pass filters could be employed.

ATS Software Data Structure The Auxiliary Timestamp (ATS) data structure is the key element in passing critical time information between the physical layer (Ethernet) and timing application layer (NTP) without modification to existing protocol packets and network stacks. The data structure contains a 64-bit timestamp, a 32-bit CRC packet identification and two 32-bit pointers—previous and next links. The ATS is used for the MAC Extender ring buffer, RATSL, TATSL and LATSL. The ATS data structure and its data fields are defined as follows:

| Normal ATS List | Late (Retransmit) ATS List |
|---|---|
| Timestamp (high order) | Error Delay (high order) |
| Timestamp (low order) | Error Delay (low order) |
| Packet Identification (CRC) | Retransmit Count |
| Previous ATS Pointer | Packet Data |

| Normal ATS List | Late (Retransmit) ATS List |
|---|---|
| Next ATS Pointer | Packet Size |
| | IP Address |
| | UDP Address |
| | Security Key ID |
| | UDP Datagram File Descriptor |
| | Previous ATS Pointer |
| | Next ATS Pointer |

Figure 15:
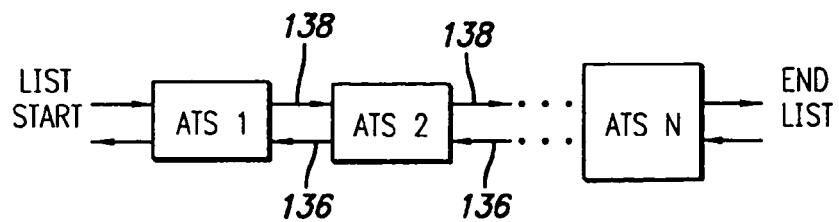
FIG. 15 shows software lists.

An Auxiliary Timestamp List (ATSL) is a doubly linked list of ATS members linked through the Previous 136 (FIG. 15) and Next ATS 138 pointer structure members. A list is sorted by the age of the timestamp value where oldest members are at the start of the list and newest members are it the bottom. The MAC Extender hardware also uses the ATS structures in a ring buffer. In this embodiment, the hardware ring buffer is permanently assigned and mapped into memory. Software lists are dynamically sized with ATS structures being exchanged between a list and a memory pool of available ATS structures. Alternatively, a single-linked list or other ring buffer scheme could be employed.

Software Details

Architectural Overview Top Level State Flow

Figure 16:
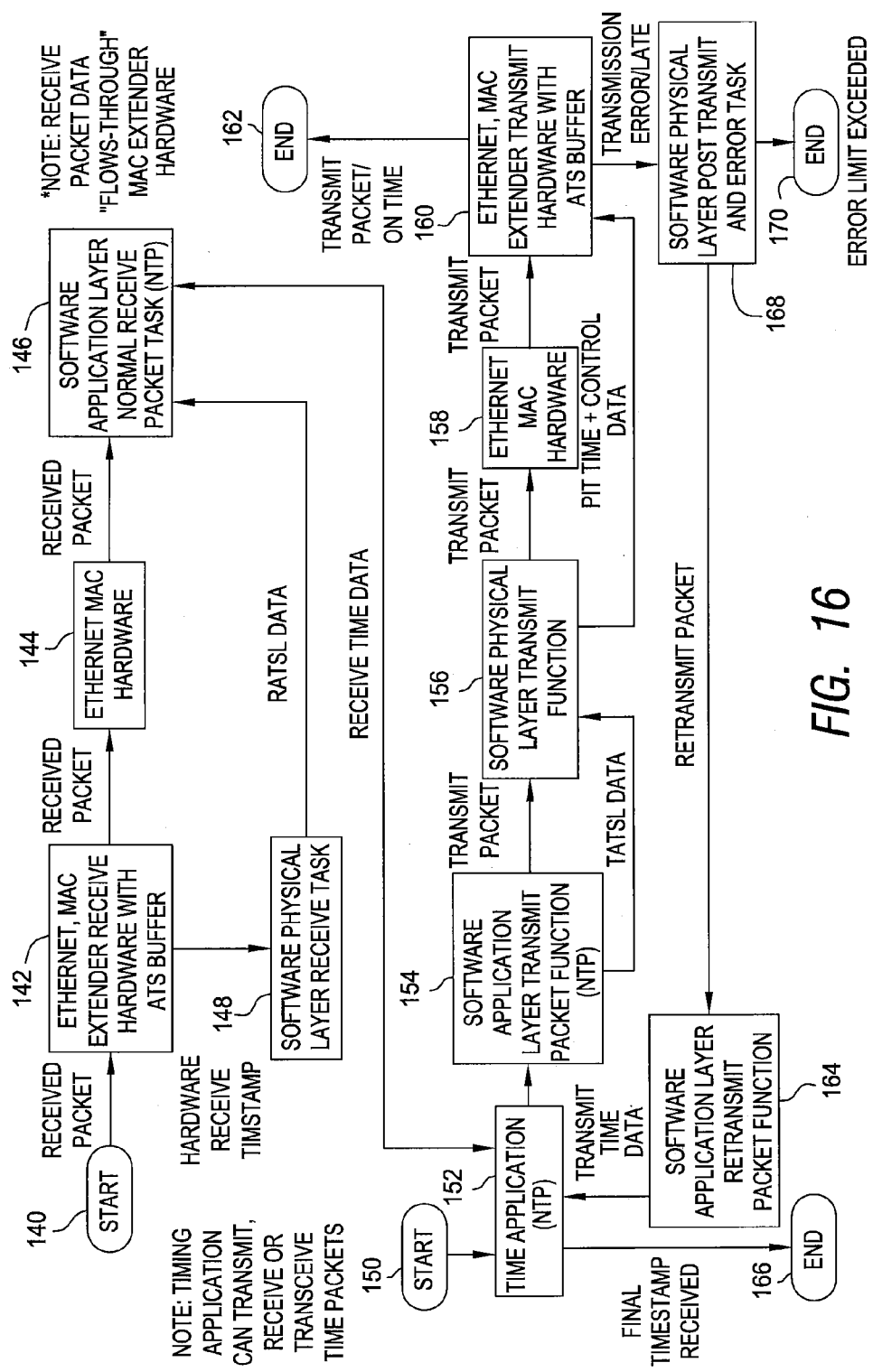
FIG. 16 shows the state flow diagram.

FIG. 16 is a state flow diagram, that traces a received packet from the Ethernet Layer, through the time application layer and finally back to the Ethernet to be transmitted. States with their text in bold indicate the names of the top level flowcharts covered in the following sections needed for the precision network timing function. The other states with plain text represent existing hardware and software in contemporary network timing situations. Text near transition arrows indicate the event that drives the system to the next state.

There are two starting points, 140 and 150. There are three end points 162, 166 and 170. From the start 140 a packet is received and enters the receive hardware of the MAC Extender 142 which has an ATS buffer. After progressing through the standard Ethernet MAC hardware, 144, the received packet enters the Software Application Layer for Normal Receive Packet Tasks 146, i.e., NTP (Network Timing Protocol). The MAC 142 Extender has placed a receive timestamp onto the received packet. The Software Layer Receive Task 148 handles non-normal Ethernet functions (RATSL—Receive Auxiliary TimeStamp List) and applies such to the packet at the normal receive processing location 146.

Either from the next start location 150 or from the normal received location 146 a packet is sent form transmission. If a final timestamp is received, such that it is the end of a roundtrip time request, the packet processing ends 166. Otherwise the packet proceeds from the time application 152 with transient time data. Then the Software Application Layer Transmit Packet Function 154 transmit a packet and generates and transmits TATSL (Transmit Auxiliary TimeStamp List) to the Software Physical Layer Transmit Function 156. Processing through normal Ethernet MAC hardware 158, a packet is transmitted to the MAC extender transmit hardware. Physical-transmit time and control data is forwarded to the MAC Extender 160. Either a Transmit packet is sent out on time and the process ends 162 or there is a transmission error or it is late and it is sent to the Software Physical Layer Post Transmit and Error Task 168. Here either the error limit is exceeded, in which case the process ends 170, or the packet is set for retransmission by way of the Software Application Layer Retransmit Packet Task 164. Then the packet is sent back to the Time Application (NTP) 152 to try to transmit again.

Figure 17:
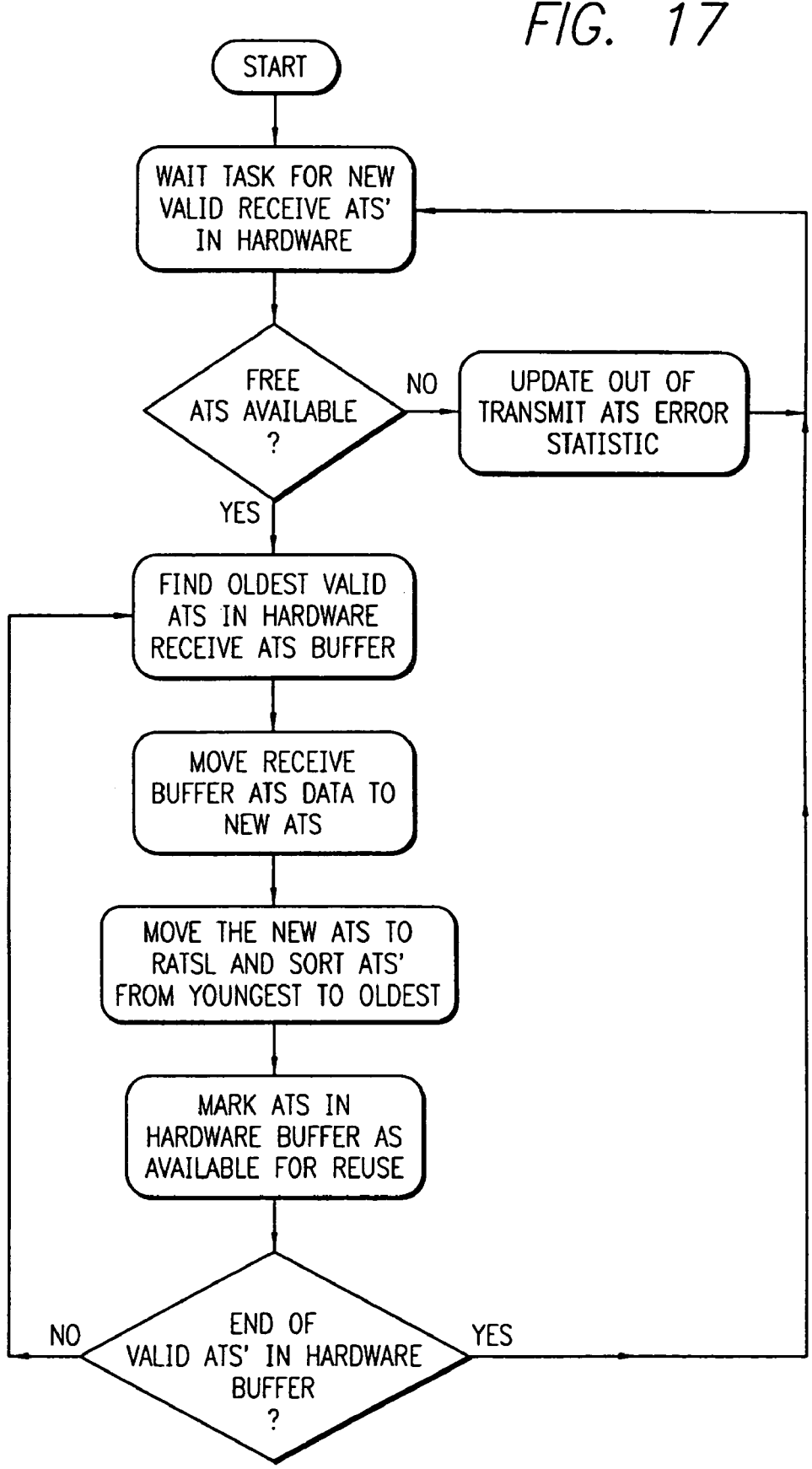
FIG. 17 is a flowchart showing the Software Physical Layer Receive Task.

Packet Reception The next flowchart, FIG. 17, shows the Software Physical Layer Receive Task (148 in FIG. 16) It should be noted that the Task Level is a higher level than Application Layer). The task starts and looks for a valid receive Auxiliary TimeStamp (ATS). If no free ATS is available, the task returns to the top level wait for valid ATS. If there is at least one fee ATS available, the task looks for the oldest valid ATS and moves the receive buffer ATS data to a new ATS. The new ATS is moved to the RATSL and the ATS are sorted from youngest to oldest. The ATS is marked in a hardware buffer as available for reuse. The cycle repeats until there are no more valid ATSs in the hardware buffer at which point it returns to the top wait task.

This Receive Task deals with all Ethernet protocols, however, with some modification it could be adapted to other physical protocols such as: SONET, ATM, FDDI, Token Ring, X.25, HDLC, LAPB and serial protocols like RS-232. In addition to the Ethernet receive function, is the flowchart that describes the insertion of the Auxiliary Timestamp Structure (ATS) to the ATSL. The ATS contains timestamp information that goes beyond what would normally be contained in a standard protocol time packet like NTP. The ATS is the method through which the Physical Layer can communicate critical precision timing data to the Time Application Layer. This communication is bi-directional. In the future, when a new time protocol is adopted for Precision Network Time, the ATS can become part of the actual packet.

The ATS and ATSL is one of the significant features of this method that allows Precision Network Timing to work with minimal changes to existing Ethernet and Protocol timing software. Further, it allows the software to work independently of protocol stack too, because ATS information does not become part of packet's checksums, authentication, or encryption that may occur it levels between the Physical and Time Application Layers.

The hardware must have certain properties for the reception of network packets. First, the hardware must precisely timestamp when the first bit of the packet is received. There can be no hardware, software or network task that call interfere with the correct determination of this time. Stating it another way, data bits from the network must stream into the receiving Precision Network Timing machine and then into packet memory in a totally time-predictable way that is repeatable to the desired precision. The delay is not important, but must be a fixed constant delay with a precision equal to or less than the timing precision desired. Static memory cache may be used for packet reception and hardware may operate in full duplex mode, although caching and full duplex mode are not required.

Receive Packet Handling Flowchart at the Timing Protocol Layer

Figure 18:
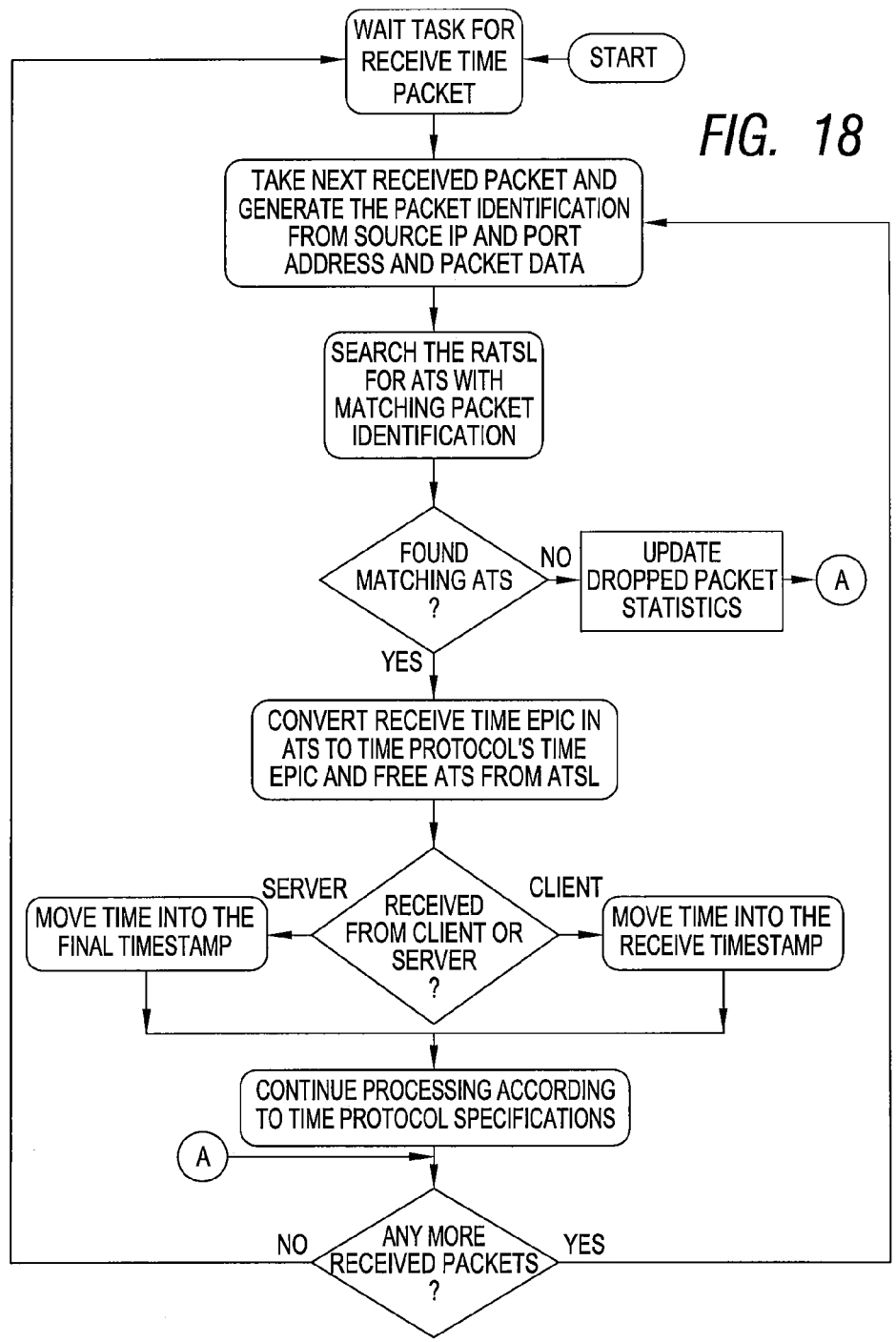
FIG. 18 is a flowchart showing timing packets at the Timing Application Layer.

The flowchart, Software Application Layer Normal Receive Packet Task, FIG. 18, explains how to handle timing packets at the Timing Application Layer Several timing applications are in the public domain and for that reason the details of time synchronization and oscillator steering have been omitted from this method. What is provided is the information needed to coordinate precision network time information between the Physical and Time Application Layers. A received packet with generated packet identification generated from the source Internet Protocol address and poll addresses and packet data is matched in the RATSL for an ATS with matching packet identification. Then the time epic is converted from ATS format to the time protocol format in network use. The receive function differentiates between receiving from a client or from a server.

The NTP protocol serves as an example of a compatible time protocol because it has the necessary four timestamps needed for the general case of Precision Network Time, but NTP is not required to implement Precision Network Time. However, if the physical line delays are insignificant relative to the desired precision, or the physical line delay is known precisely, only two timestamps are needed. For the two-timestamp case, either the client to server path or the server to client path can be used, i.e., whatever benefits time the best. Also, time can be broadcast from a timeserver to time clients. In this case, when the receive timestamp is subtracted from the transmit timestamp, any time delay beyond the physical line delay is the offset in time from the time client to the timeserver.

Identifications include the source IP and Port addresses and enough of the NTP packet to include the timestamps. To save space, this information can be reduced to a CRC and to increase speed, the CRC can be performed in the hardware. This same operation is used again in the transmit side of the Physical Layer to link the ATS to a packet. However, the Destination IP and Port addresses are used instead.

Packets enter into the Application Layer by two paths. The first path is for packets just received from the Physical Layer desiring processing from the Time Application for the first time. The second path is for packets returned from the Physical Layer due to transmission errors. Any transmission error at all prevents the hardware from re-transmitting the packet because the time protocol must recalculate a new transmission time before sending the packet out again.

Figure 26:
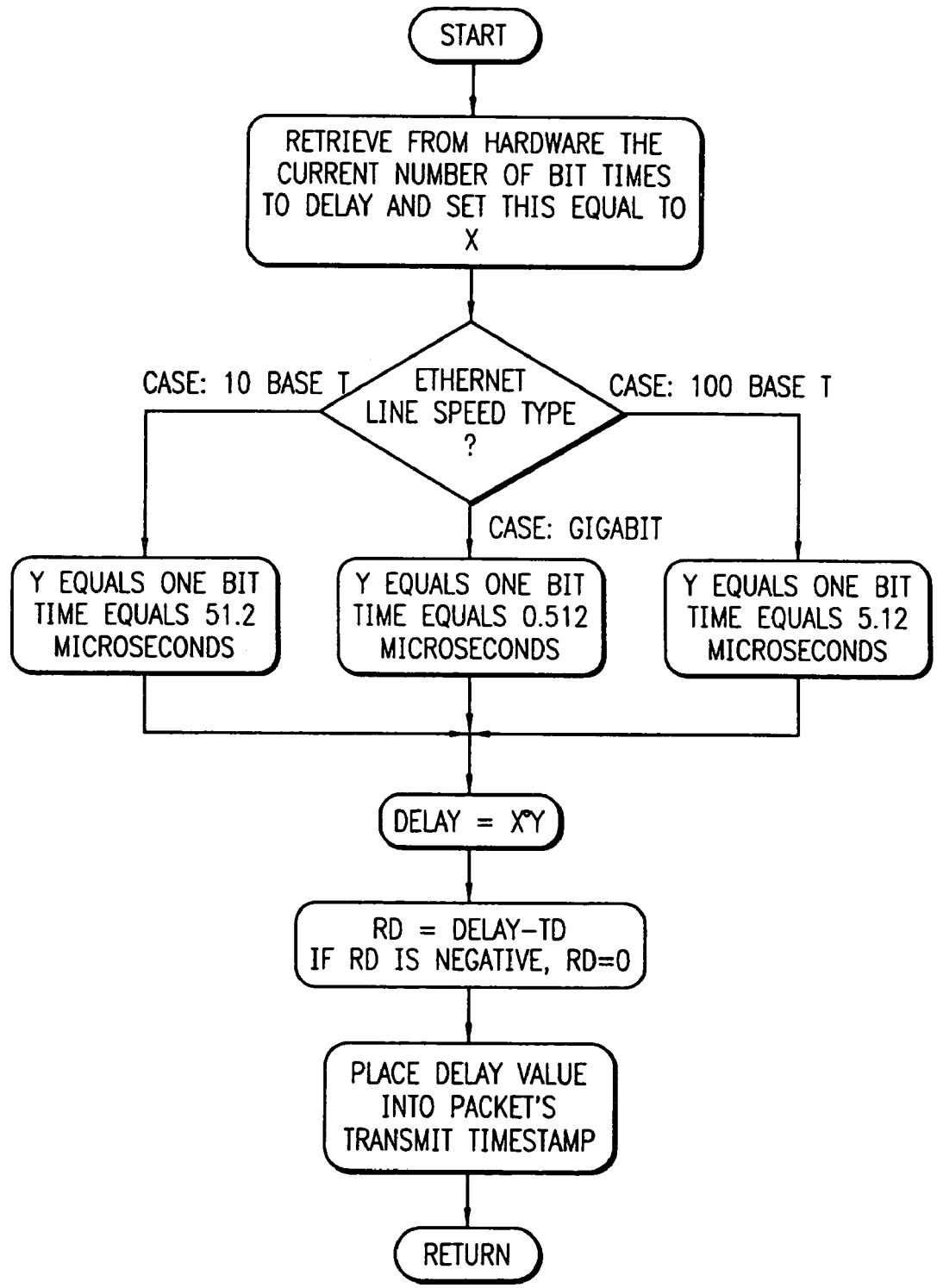
FIG. 26 is a flowchart showing the Pause Error Function.

Flowcharts pertaining to errors peculiar to Ethernet are the collision detection FIG. 24 and the PAUSE errors FIG. 26 (discussed below). It is possible and desirable to configure Ethernet in full duplex mode with PAUSE mode turned off. This will give the greatest possible precision to the network timestamps with the least amount of trouble and these two flowcharts (FIGS. 24 and 26) can be ignored.

If using Ethernet in half duplex mode, then the hardware must have the property to not automatically retransmit the packet for both early and late collisions. Instead, the hardware detects the collision and notifies the software of the error and the software sends the packet back in the manner described by the flowcharts.

Figure 25:
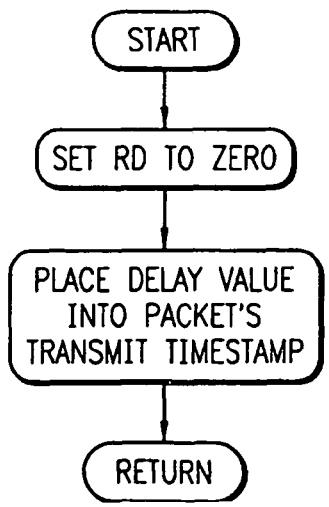
FIG. 25 is a flowchart showing the Late Transmission Error Function.

In all cases, hardware must be able to detect if the requested transmission time specified has already passed. In this case, packets are return ed to the Application Layer as the Late Error case flowchart (FIG. 25).

Finally, any traditional transmit errors detected, such as faulty line conditions, will be managed by a default error handler.

Changes to Standard NTP for Receive In addition to the code required by the flowcharts, there are some required modifications to the Timing Application software. This method has been engineered to have the least amount of impact on an existing time protocol. None-the-less, a few very precise modifications are required. For the discussion of this method, the NTP code NTP version 4 revision 95 is used as a specific working example of what needs to be done.

In the original NTP code, the received timestamp for a packet is filled in by a call to "get_systime" in the function "service_main." This call must be removed and instead a function call is made to convert the Receive Timestamp in the ATS to NTP time and store that value into the structure parameter of the original call to "get_systime." Also, at this point in the code, the ATS is identified in the RATSL by its associated identification in the packet. Identifications include the source IP and Port addresses plus the source IP address and enough of the NTP packet to include the timestamps. To save space, this information can be reduced to a CRC and to increase speed the CRC can be performed in the hardware. As a point of information about NTP, the transmit timestamp in the newly received NTP packet is the time that the packet was transmitted from an NTP client. Later, before the packet is transmitted to the Physical Layer, the packet's transmits timestamp is moved to the packet's Originate timestamp by the NTP software and NTP predicts a new transmit time before sending it to the Physical Layer. The function for predicting a NTP transmit time is covered in the flowcharts.

Packet Transmission Details

At the top of the main loop in NTP's "service_main" function the Software Application Layer Retransmit Packet Function call is added. This new function scans the LATSL for packets. Packets in the list are retransmitted to the physical layer. Before retransmiting a packet, the function calculates a new NTP transmit timestamp and adds any error delay to the transmit time. Next, any needed NTP security procedures are called for the packet and all necessary transmit and retransmit data is recorded into the ATS and the ATS is moved from the LATSL to the TATSL. Finally, the NTP "sendpkt" function is called and the packet is transmitted.

For normally transmitted packets, NTP must be modified as well. In the NTP transmit functions "fast_xmit" and "peer_xmit", the call to "get_systime" must be replaced by the function specified in the flowcharts for transmission from the Timing Application to the Physical Layer. In addition to the new "get_systime" function, the packet Identification, Transmit time, UDP datagram file descriptor and Key Identifier information must be added to the ATS and the ATS added to the TATSL just before the call to the NTP "sendpkt" function.

In addition, when transmitting Gigabit Ethernet packets, all NTP time packets must be padded so that their length is at least 512 bytes. The reason for this is the Gigabit Ethernet layer will accumulate packets smaller than this until a total of at least 512 bytes is accumulated then the packets are transmitted. Thus, small packets, like NTP, would not be time predicable when they are transmitted. The reason for the padding is a packet must be this length for collision detection to work for Gigabit Ethernet.

Figure 19:
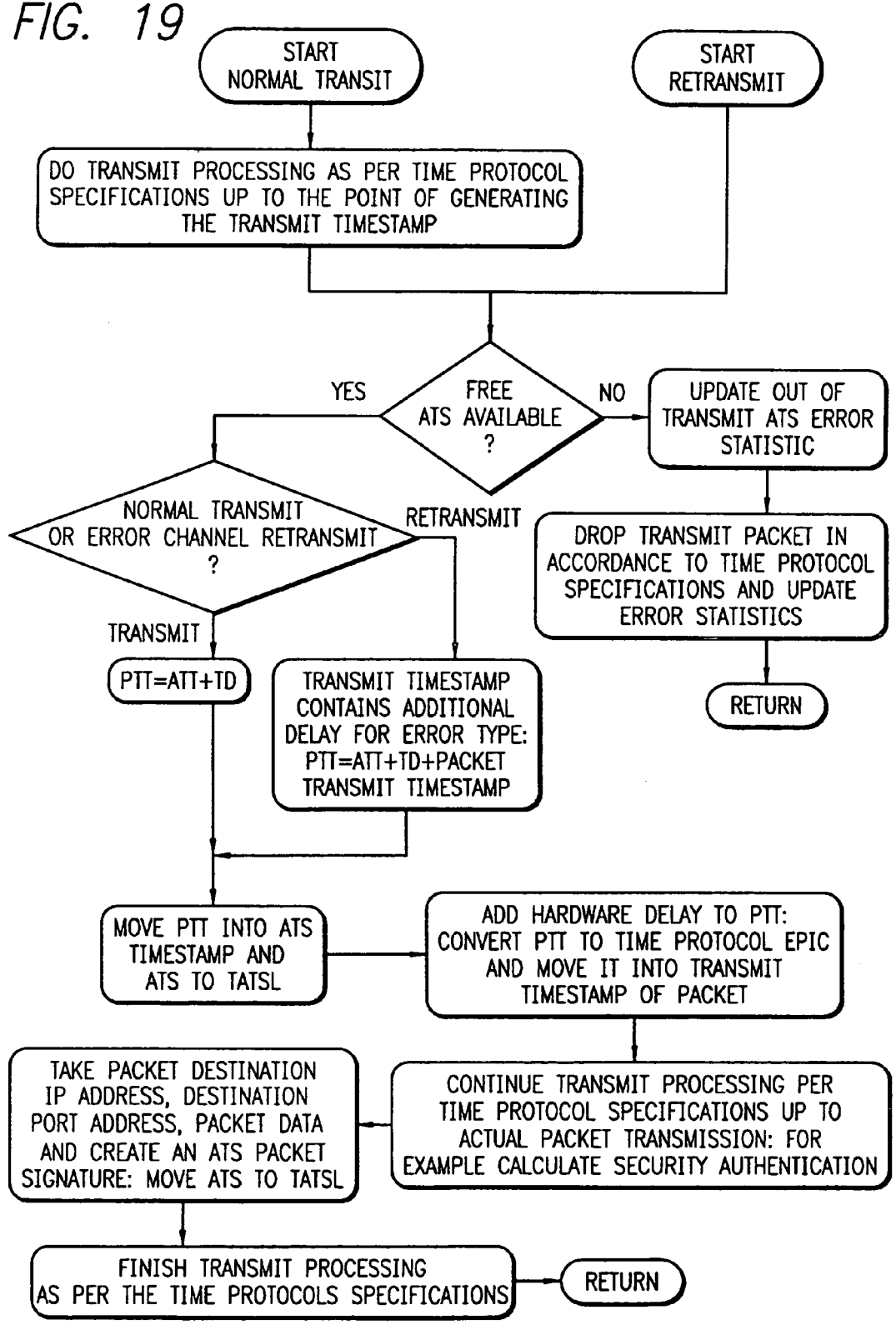
FIG. 19 is a flowchart of the Software Application Layer Transmit Packet
Figure 20:
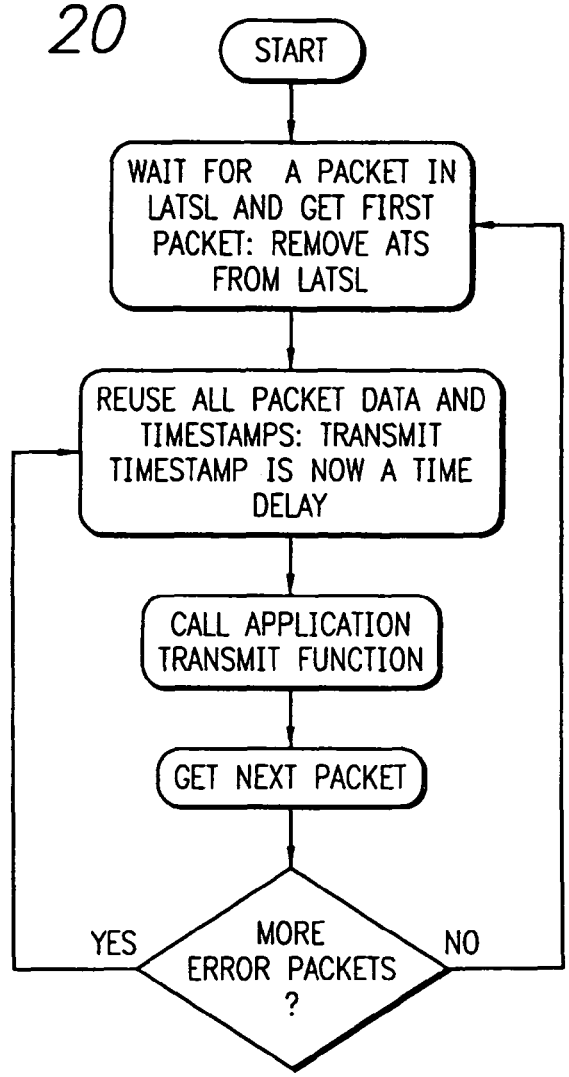
FIG. 20 shows the Software Application Layer Retransmit Packet Task.

Transmit Packet Flowcharts at the Timing Protocol Layer The transmit flowcharts, FIG. 19 (normal transmit) and FIG. 20 (retransmit), indicate the changes from existing time protocol transmit functions. NTP is used as an example. Inside the NTP code are two transmit functions "fast_xmit" and "peer_xmit." Within these functions are calls to the function "get_systime." Inside these functions, calls to "get_systime" must be replaced with a new function that behaves according to the transmit flowchart FIG. 19. In summary, instead of getting the current system time, the new function must predict the time at which Physical Layer hardware can transmit the time packet. The ATS is giving the time for the hardware to start the transmission and the actual transmit timestamp in the NTP must contain the time the packet actually comes out on the network. The difference between the ATS transmit and the NTP transmit times is the delay in hardware from the time the packet transmit starts to the time the first bit of the transmitted packet enters the network. The physical transmit time (PTT) is the sum of the application transmit time (ATT) and the Transmit Delay (TD).

Retransmission (FIG. 20) operates with the reuse of all packet data and timestamps. The transmit timestamp represents a delay accounting for specific physical layer errors.

This is seen from the Retransmit branch in FIG. 19. The packet is sent to the application layer for retransmission.

Figure 21:
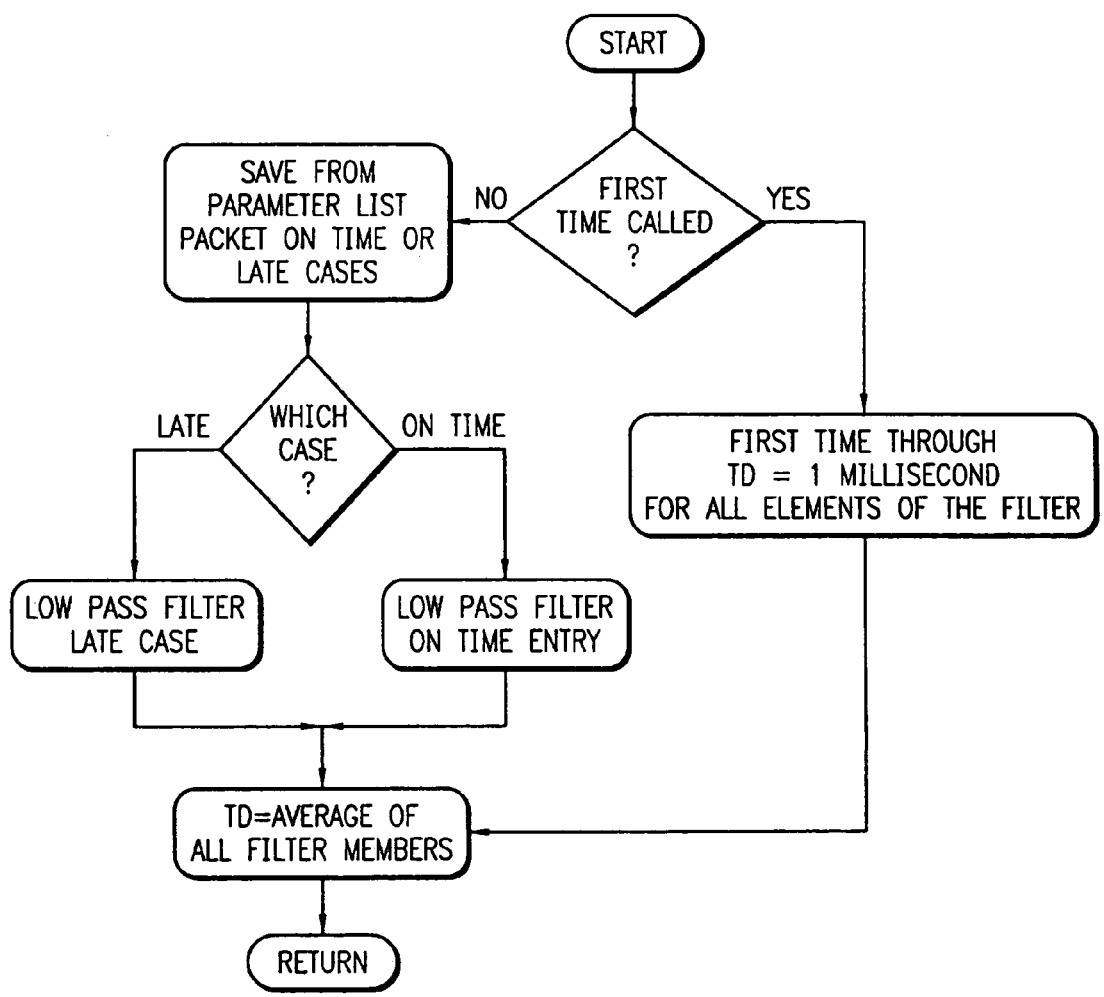
FIG. 21 is a flowchart showing the time Delay Function.

A feature of this approach is the predicted time the packet is transmitted is adaptive to systems execution speed and loading. The time delay form packet processing at this point in the Timing Application to the start of hardware transmission is called the Transmit Delay. The value of the delay is calculated by the Transmit Delay function (FIG. 21). This function, makes use of Late Case and On Time Entry low pass filter.

Transmit Packet Flowcharts at the Physical Layer The flowcharts, FIGS. 22 and 23, show the additions to the Physical Layer, which achieve transmission of Precision Network Time packets. An alternative design could take the logic of FIGS. 22 and 23 and move this into hardware. The advantage would be that Ethernet software needs no modifications. Packets that are not precision time packets are handled accordingly to the particular Physical Layer protocol. For this method, the Ethernet Physical Layer protocol is used as an example. Only the functions that are outside of the Ethernet protocol are described in the flowcharts. Precision time packets are identified by the specification of the IP and the NTP destination port address within the packet. If needed, other timing and network protocols can be recognized as well.

The result of the transmission will be successful or unsuccessful. Successful transmission means resources assigned to the packet are reclaimed by the system. This includes the return of the ATS to is memory pool. Transmission errors result in the packet being returned to the Timing Application through the special error channel. Packets are returned as whole data units with their corresponding ATS updated. The ATS contains all information required by the time application, including, but not limited to, socket addresses, socket descriptions, retry count, error delay, packet data and security information. Information is in the Late Auxiliary Timestamp List (LATSL). The Application Layer will correctly handle the recalculation of the transmit times using error information in the ATS.

The Physical Layer transmission hardware must have a number of properties. The central idea is that any possible event that would invalidate the transmit timestamp of the packet is considered an error. Therefore, the hardware must never automatically retransmit the packet. Otherwise the transmit time is incorrect for the packet. Also, hardware must be able to begin transmission of the packet at the time specified in the ATS. Further, the delay from this commanded start of transmission in the ATS to the time the first bit of the packets is on the physical network must be a fixed constant time. No other tasks in hardware, software, or the network may interfere with the predictability of this transmission time. In addition, hardware must recognize as an error when the programmed transmit time has passed and transmission at the correct time is not possible Also, transmissions halted due to flow control like the Ethernet PAUSE must result in a transmission error and the hardware must return the amount of time left in the waiting period. Further, in the case of Ethernet in half duplex mode both early and late collisions must be recognized as collision errors and the packet must not be transmitted and the collision must be reported to the software. Finally, any traditional Physical Layer errors, such as bad line conditions, result in errors. Again, in all transmit error cases, hardware does not retransmit the packet, but instead notifies the software so that the packet can be returned to the Timing Application for new a new transmit timestamp.

Another important item that the Physical Layer hardware function must provide is the calculation of when the packet was transmitted relative to the time it took the packet to come from the Timing Application Layer (in other words, the TRT value). The ATO is updated with new values according to the flowchart in this section, to account for changes in the time delay from the Application Layer to physical transmission. In this way, the system can adapt to internal process loading and maintain the best possible packet throughput.

Finally, time packets can be lost or discarded in the network stack or timing application. The result is that ATSs assigned to packets are slowly used up and left in limbo. Periodically, a task is needed to check the timestamps within the ATSLs against the real time. One can specify as a safe rule that one should use a period that is twice as great as the maximum time to process a time packet from receipt to final transmission.

Collision Error Function (FIG. 24) The Collision Error function can only be called when Ethernet hardware is running in half-duplex mode. Half-duplex mode should only be used with older unswitchable hubs, less than category 5 cable or coaxial cable. This mode is not desirable because Ethernet transmit and receive units will not be independent and so unpredictable hardware timing errors are inevitable. In the interest of time precision and packet throughput, it is best to place the Ethernet link into full-duplex mode with the PAUSE option turned off. Still, in half-duplex mode, this algorithm along with the rest of the precision timing protocol makes the best use of the situation. Using this technique, timing below 100 microseconds is achievable and beats the usual 1 millisecond precision when not using the precision timing protocol at all. Note the three cases: 10 Base T, 100 Base T and Gigabit.

This Collision Error Function calls a function that is defined for resolving the time to wait after an Ethernet collision before re-transmitting the packet. The official name of the function is the "truncated binary exponential backoff" algorithm. This function is well defined in the IEEE standard for Ethernet. The function takes as input the number of failed transmissions starting at 1 and returns the number of Ethernet slot times to wait.

Late Transmit Error Function (FIG. 25) The Late Transmit Error function is called when the Ethernet precision time hardware determines that the transmit time requested is too late for transmission.

Figure 24:
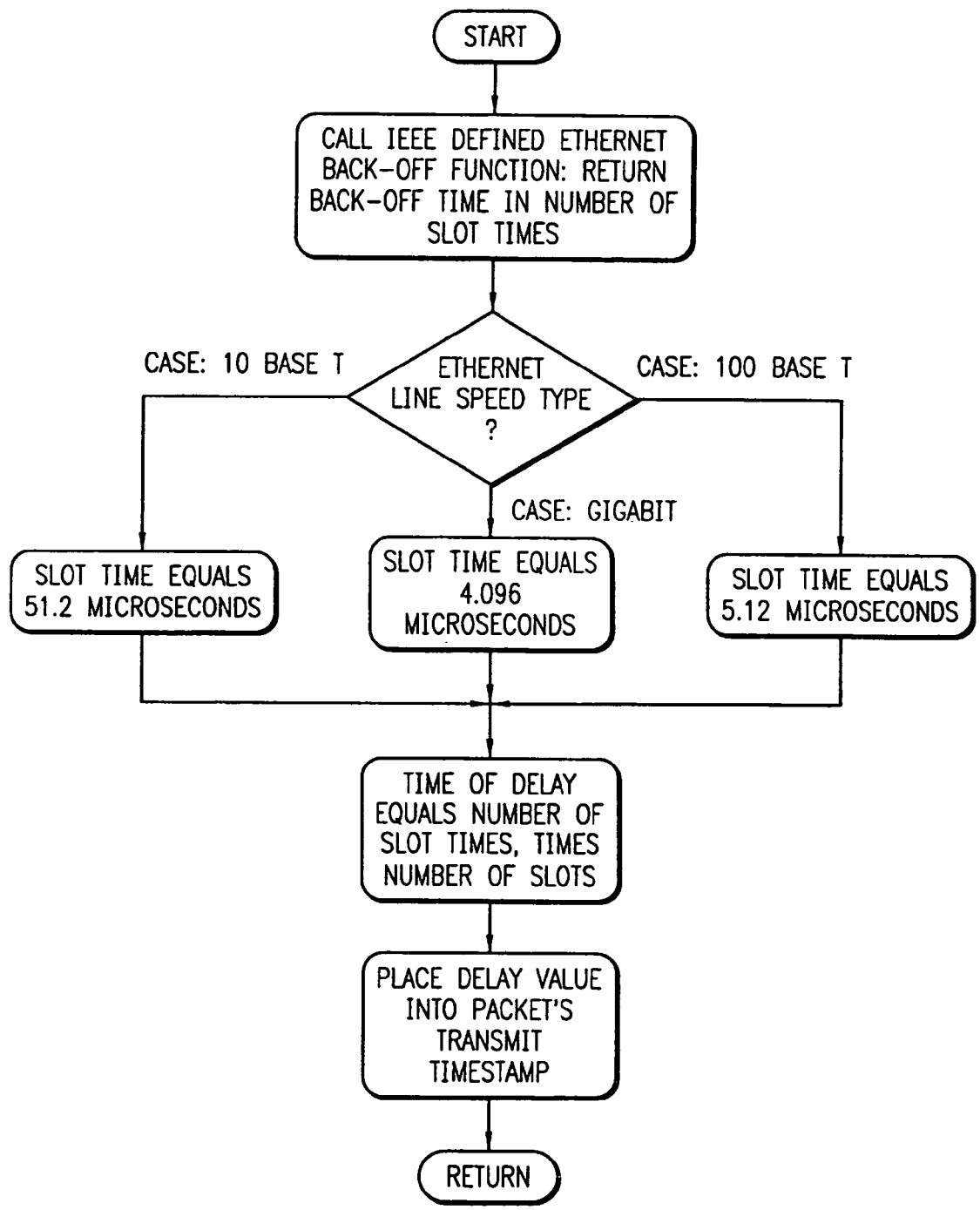
FIG. 24 is a flowchart showing the Collision Error Function.

Pause Error Function (See FIG. 26) Compare this to the Collision Error Fuction, FIG. 24. Again three cases are covered: 10 Base T, 100 Base T and Gigabit.

Figure 27:
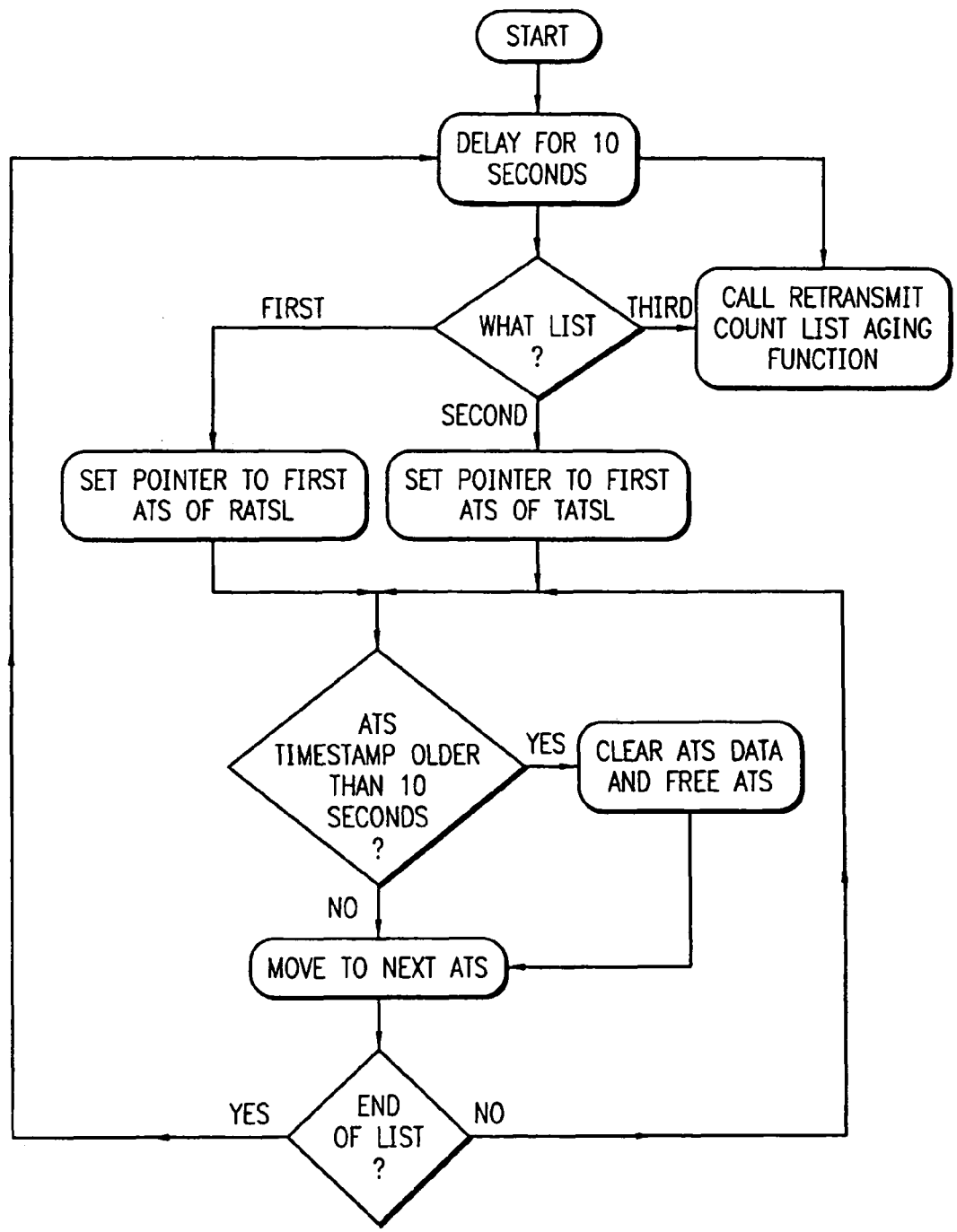
FIG. 27 is a flowchart showing the Auxiliary Timestamp Aging Task.
Figure 28:
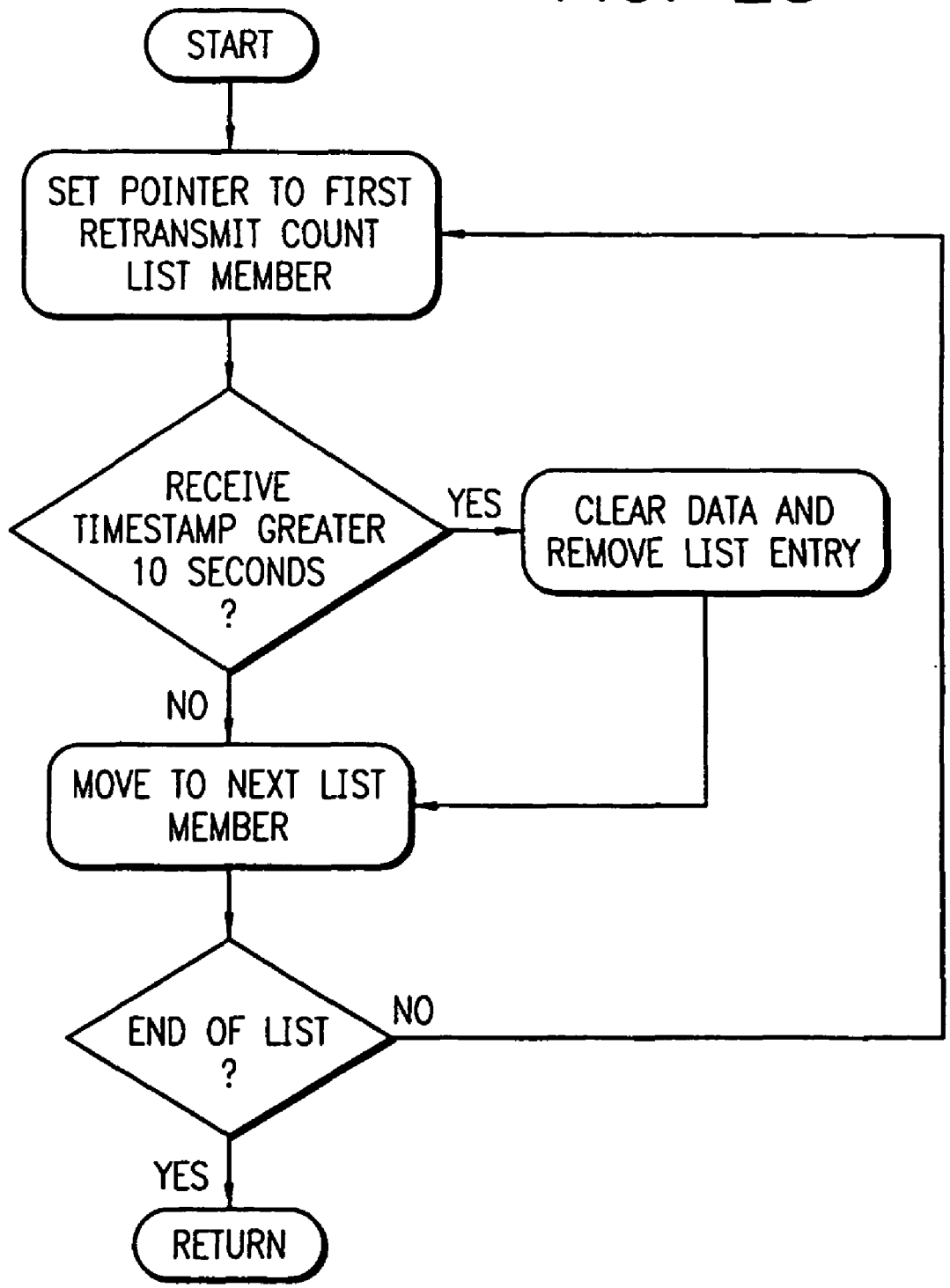
FIG. 28 is a flowchart showing the Retransmit Count Aging Function.

Aging Procedures (See FIG. 27 and FIG. 28) First the flow chart for the Auxiliary TimeStamp List (ATSL) aging task is shown in FIG. 27. ATS timestamps older than 10 seconds are shown as cleared. Of course, 10 seconds could be set to a different desired time number. The Retransmit Count List aging function is shown in FIG. 28. Again, the aging time, of 10 seconds, after which the data is cleared and the list entry is removed, can be chosen differently.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronizing a first clock with a second clock connected over a network, comprising:
   receiving a packet from an application layer, wherein the packet includes a transmit timestamp specifying a time of transmission;
   adding the packet to a transmit buffer;
   examining the time of transmission specified in the packet;
   transmitting the packet over the network when the time specified by the transmit timestamp of the packet has been reached;
   receiving the packet from the network, wherein the packet includes first and second timestamps;
   marking the packet with a receive timestamp upon receipt of the packet before sending the packet to a receive buffer; and
   adjusting the first clock using the transmit timestamp, the receive timestamp, and the first and second timestamps.

2. The method of claim 1, further comprising:
   determining a receive time difference using the first timestamp and the transmit timestamp; and
   determining a transmit time difference using the receive timestamp and the second timestamp,
   wherein the first clock is adjusted based on the receive time difference and the transmit time difference.

3. An apparatus for time stamping packets used in synchronizing a first clock with a second clock connected over a network, comprising:
   an auxiliary receive timestamper for applying an auxiliary timestamp to arriving packets before sending the packets to a receive buffer, wherein said auxiliary timestamp is in addition to any existing network protocol timestamp;
   an auxiliary transmit timestamper for applying an auxiliary timestamp that specifies a time that is set in the future for each packet to be transmitted;
   a network transmitter for transmitting each packet to be transmitted at the time specified in the auxiliary timestamp of the packet to be transmitted;
   a network that runs according to standard network protocol rules, including packet structure rules; and
   a media access controller extender apparatus transparent in operation to existing hardware, said media access controller extender being configured to supply auxiliary timestamps and utilize said auxiliary timestamps to reduce timing uncertainty on a network.

4. An apparatus synchronizing a first clock with a second clock connected over a network, comprising:
   means for adding a packet having a transmit timestamp to a transmit buffer, the transmit timestamp specifying a time of transmission;
   an auxiliary apparatus that is configured to transmit the packet at the time of transmission specified in the packet, receive the packet from the network, the packet including first and second timestamps, and mark the packet with a receive timestamp upon receipt of the packet before sending the packet to a receive buffer; and
   means for adjusting the first clock using the transmit timestamp, the receive timestamp, and the first and second timestamps.

5. The apparatus of claim 4 further comprising:
   a first auxiliary differencing unit which computes a first time difference between the first timestamp and the transmit timestamp; and
   a second auxiliary differencing unit which computes a second time difference between the receive, timestamp and the second timestamp,
   wherein the first clock is adjusted based on the first time difference and the second time difference.

6. The apparatus of claim 5 wherein said receive and said transmit timestamps reduce time uncertainty in packet reception and transmission, said transmit and receive timestamps represent transmit and receive times of packets at physical interfaces, thereby preventing unknown delays which might arise from the network application layers.

7. A method for improving time precision in a network including a first clock and a second clock using a packet based network time protocol that is transmitted and received in accordance with a data packet transmission protocol that also includes an error checking code for use in detecting transmission errors in the received data packets, comprising:
   determining a scheduled time of transmission when each packet containing network timing information is to be released for transmission from a respective first or second physical interface to the network;
   writing the scheduled time of transmission and the associated error checking code in each outgoing information packet;
   releasing each outgoing information packet at the respective physical interface when the first or second clock associated with that interface indicates that the current time is equal, within a predetermined precision, to the respective said scheduled time of transmission;
   using the respective other clock to determine, within the predetermined precision, a time of reception when each released information packet is received at the other physical interface to said network;
   storing said time of reception in an auxiliary timestamp external to the information packet in a manner that is transparent to said transmission protocol without any updating of said error checking code;
   associating each auxiliary time stamp with the respective incoming information packet; and
   using the time of reception data in the auxiliary timestamps and the scheduled time of transmission data in the information packets to synchronize the first clock to the second clock.

8. The method of claim 7 wherein said network time protocol is an existing time protocol and said transmission protocol is an existing transmission protocol.

9. The method of claim 8, wherein the arriving packets are sent to a receive buffer after the auxiliary timestamp has been stored.

* * * * *